(12) United States Patent
Walden

(10) Patent No.: US 12,526,898 B2
(45) Date of Patent: Jan. 13, 2026

(54) LUMINAIRE WITH MULTI-DIRECTIONAL LIGHTING CONTROLS

(71) Applicant: Parabolix Lighting, LLC, Los Angeles, CA (US)

(72) Inventor: Henry David Walden, Los Angeles, CA (US)

(*) Notice: Subject to any disclaimer, the term of this patent is extended or adjusted under 35 U.S.C. 154(b) by 58 days.

(21) Appl. No.: 18/731,641

(22) Filed: Jun. 3, 2024

(65) Prior Publication Data

US 2024/0407070 A1 Dec. 5, 2024

Related U.S. Application Data

(60) Provisional application No. 63/470,400, filed on Jun. 1, 2023.

(51) Int. Cl.
| | |
|---|---|
| *H05B 47/155* | (2020.01) |
| *F21V 21/06* | (2006.01) |
| *F21V 23/00* | (2015.01) |
| *F21V 23/06* | (2006.01) |
| *F21Y 115/10* | (2016.01) |
| *H05B 47/19* | (2020.01) |

(52) U.S. Cl.
CPC ......... *H05B 47/155* (2020.01); *F21V 23/006* (2013.01); *F21V 23/06* (2013.01); *H05B 47/19* (2020.01); *F21V 21/06* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 5,463,536 | A | 10/1995 | Chou et al. |
| 5,841,146 | A | 11/1998 | Briese |
| 6,787,999 | B2 | 9/2004 | Stimae et al. |
| 6,908,214 | B2 | 6/2005 | Luk |
| 7,053,557 | B2 | 5/2006 | Cross et al. |
| 7,083,298 | B2 | 8/2006 | Pritchard et al. |
| 7,507,001 | B2 | 3/2009 | Kit |
| 7,524,089 | B2 | 4/2009 | Park |
| 7,810,968 | B1 * | 10/2010 | Walker ............ F21V 21/30 362/249.02 |
| 7,832,909 | B2 | 11/2010 | Wang |

(Continued)

OTHER PUBLICATIONS

U.S. National Stage U.S. Appl. No. 18/019,740, filed Feb. 3, 2023, to Henry David Walden, claiming priority to Appl. No. PCT/US21/60818.

(Continued)

*Primary Examiner* — Anh Q Tran
(74) *Attorney, Agent, or Firm* — AdamsIP, LLC; Stephen Thompson; James Hunter Adams

(57) ABSTRACT

A luminaire and lighting system for multi-directional lighting controls for customizing lighting effects in multiple directions surrounding the luminaire are provided. The system includes the luminaire and an external power supply unit that can be plugged into the luminaire. The luminaire has multiple individually controllable lighting zones disposed radially around an elongate body. The luminaire utilizes a single power supply circuit for all lighting zones and a communications protocol for controlling dimming and other lighting effects for each separate lighting zone.

20 Claims, 19 Drawing Sheets

(56) References Cited

U.S. PATENT DOCUMENTS

| | | |
|---|---|---|
| 7,997,770 B1 | 8/2011 | Meurer |
| 8,128,258 B2 | 3/2012 | Lodhie |
| 8,585,238 B2 | 11/2013 | Krogman |
| 8,680,754 B2 | 3/2014 | Premysler |
| 8,702,265 B2 | 4/2014 | May |
| 8,727,574 B2 | 5/2014 | Simchak et al. |
| 8,888,315 B2 | 11/2014 | Edwards et al. |
| 9,267,662 B2 | 2/2016 | Portmann |
| 9,638,398 B2 | 5/2017 | Nicolai et al. |
| 9,673,582 B2 | 6/2017 | Guilmette |
| 9,915,854 B2 | 3/2018 | Kim, II |
| 10,088,111 B2 | 10/2018 | Hudson |
| 10,119,659 B2 | 11/2018 | Novin et al. |
| 10,539,310 B2 | 1/2020 | Nolan et al. |
| 10,788,163 B2 * | 9/2020 | Ramaiah ................ F21K 9/232 |
| 10,941,908 B2 | 3/2021 | May |
| 2005/0281047 A1 | 12/2005 | Coushaine et al. |
| 2007/0222399 A1 | 9/2007 | Bondy et al. |
| 2009/0261706 A1 | 10/2009 | Sorella et al. |
| 2011/0012540 A1 * | 1/2011 | Lan ....................... H05B 45/10 |
| | | 315/320 |
| 2013/0107527 A1 | 5/2013 | Boyer et al. |
| 2013/0314916 A1 | 11/2013 | Clore |
| 2013/0322051 A1 | 12/2013 | Ortiz-Gavin |
| 2015/0176834 A1 | 6/2015 | Avedon |
| 2016/0290619 A1 | 10/2016 | Schreder |
| 2018/0101088 A1 * | 4/2018 | Robinson .......... G03B 21/2033 |
| 2018/0238523 A1 | 8/2018 | Hudson |
| 2021/0132469 A1 | 5/2021 | Hudson |
| 2024/0295303 A1 * | 9/2024 | Walden .................. F21V 17/10 |

OTHER PUBLICATIONS

International Search Report, mailed Mar. 25, 2022 for Appl. No. PCT/US21/60818, filed Nov. 24, 2021, to Henry David Walden.
Written Opinion of the International Searching Authority, mailed Mar. 25, 2022 for Appl. No. PCT/US21/60818, filed Nov. 24, 2021, to Henry David Walden.

* cited by examiner

LUMINAIRE WITH MULTI-DIRECTIONAL LIGHTING CONTROLS

CROSS REFERENCES

This application claims the benefit of U.S. Provisional Application No. 63/470,400, filed Jun. 1, 2023, which application is incorporated herein in its entirety by reference.

FIELD OF THE DISCLOSURE

The subject matter of the present disclosure refers generally to a luminaire having multi-directional lighting controls for customizing lighting effects in multiple directions surrounding the luminaire.

BACKGROUND

Photographers and cinematographers utilize various types of luminaires and lighting systems to provide desired lighting effects upon subjects being photographed or filmed. Such luminaires and lighting systems may also be used for live theatre or any other applications in which lighting effects are desired. Lighting modifiers, such as umbrella reflectors and softboxes, may be utilized to provide soft lighting effects by bouncing light from a luminaire off of a concave, reflective inner surface of the modifier. The luminaire may be mounted within an interior of the lighting modifier, and indirect light from the lighting modifier then creates the softening effects on the subject. Photographers and cinematographers commonly use luminaires with lighting modifiers to control lighting effects for still photography, cinema, stage, videography, or studio applications.

In some instances, it is desired to provide different types of lighting and lighting effects in different areas of a room or stage. For instance, in a scene in which multiple actors are occupying areas of a film or theatrical stage, a director may wish to expose different actors to different lighting at the same time. In other instances, the director may wish to simultaneously effectuate different lighting effects, such as different colors and/or patterns of lights, on different areas of a stage. These types of varying lighting effects are generally achieved utilizing multiple lighting fixtures arranged ad hoc to produce stage lighting having a specifically desired overall effect. This process can be difficult and time consuming, thereby costing valuable production time for film and theatrical productions or any other applications in which varying lighting is desired simultaneously within an area.

SUMMARY

A luminaire and methods of utilizing the luminaire are provided. The luminaire has multi-directional lighting controls for customizing lighting effects in multiple directions surrounding the luminaire. The luminaire has an elongate body having a base end and an opposing top end. The luminaire includes a light source configured to emit light radially from the body relative to a longitudinal axis extending from the base end to the top end. The light source comprises a plurality of light zones with each zone preferably comprising a plurality of LED lights. Each light zone extends longitudinally along a length of the body, and the plurality of light zones in combination is configured to emit light radially from the body in a 360-degree arc about the longitudinal axis. Each of the plurality of zones is independently controllable. Thus, the luminaire allows a user to control the spread or coverage of light within a space around a complete 360-degree arc surrounding the luminaire, which allows a space to be lighted in multiple ways using only a single fixture. Individually controllable light zones also allow for special effects to be achieved using a single fixture rather than multiple separate fixtures.

The luminaire comprises a circuit board, which is preferably mounted on the body of the luminaire. The circuit board is designed to allow for individually controllable light zones on a single fixture using minimal components. The circuit board comprises a process controller and a plurality of digital switches or transistors. A power supply cable connects the luminaire to an external power supply unit. The power supply unit may be plugged into mains AC (alternating current) power to supply power to the unit. The power supply cable preferably includes both power supply lines and one or more data lines, each of which is connected to the circuit board when the luminaire is plugged into the power supply unit. The process controller is configured to distribute and regulate power independently to each of the light zones based on data signals transmitted from the power supply unit via the data lines of the power supply cable. The process controller receives the data signals based on user input to the power supply unit and then controls the digital switches to regulate power to each of the light zones in order to individually control dimming of each of the separate light zones. Thus, the power supply cable connecting the luminaire to the power supply unit does not include individual circuit wiring for powering each of the light zones separately.

The luminaire may be utilized on its own to provide lighting generally or optionally in combination with a lighting modifier to create additional lighting effects. In a preferred embodiment, the luminaire may be configured to be mounted at only the base end, only the top end, or at both ends. The luminaire may be operated to provide lighting regardless of the mounting configuration. In this preferred embodiment, a base mounting plate is disposed at the base end and a top mounting plate is disposed at the top end. Each of the base mounting plate and the top mounting plate is designed to be individually mounted onto a mounting structure, such as a stand, to support the luminaire on the mounting structure. Thus, the luminaire may be mounted onto the stand or other mounting structure using either one of the base mounting plate or the top mounting plate to provide support for the luminaire, depending on user preference. The stand may also support a lighting modifier, such as an umbrella reflector, having a concave inner reflective surface that defines an interior of the lighting modifier in which the luminaire is disposed when mounted onto the stand. The luminaire may then emit light directly toward the inner reflective surface to produce indirect lighting from the lighting modifier onto a subject. The luminaire may optionally include a second plurality of LED lights disposed on an exterior side of the top mounting plate. The second plurality of lights can be activated independently of the light zones distributed around the body so that light can be emitted by the luminaire from the exterior of the top mounting plate independently of the light zones. When the luminaire is mounted with the top mounting plate facing inwardly toward the inner surface of the lighting modifier, the second plurality of lights may be activated to provide additional indirect light reflected off of the reflective inner surface of the lighting modifier. When the luminaire is mounted with the top mounting plate facing outwardly away from the inner surface of the lighting modifier, the second plurality of lights may be deactivated to minimize direct light on the subject, while one or more of the light zones distributed around the body of the luminaire are activated to provide indirect lighting on the subject.

The body of the luminaire preferably comprises a plurality of heat sink plates disposed in spaced relation to each other to efficiently disperse heat produced by the lights. The luminaire may further comprise a support structure attached to both the base mounting plate and the top mounting plate to provide structural support for components of the luminaire. The support structure may comprise a plurality of rods extending between the base mounting plate and the top mounting plate. Each rod may be attached to the base mounting plate at one end and to the top mounting plate at an opposing end. Individual rods may be distributed around the exterior of the body of the luminaire.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

The present disclosure provides a luminaire for multi-directional lighting and lighting systems for use in photographic, theatrical, cinematic, and videography settings in accordance with the independent claims. Preferred embodiments of the claimed invention are reflected in the dependent claims. The claimed invention can be better understood in view of the embodiments described and illustrated in the present disclosure, viz. in the present specification and drawings. In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the invention per se.

In the Summary above and in this Detailed Description, and the claims below, and in the accompanying drawings, reference is made to particular features, including method steps, of the invention as claimed. In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features. It is to be understood that the disclosure in this specification includes all possible combinations of such particular features. For example, where a particular feature is disclosed in the context of a particular aspect or embodiment, or a particular claim, that feature can also be used, to the extent possible, in combination with/or in the context of other particular aspects or embodiments, and generally in the invention as claimed.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 8:
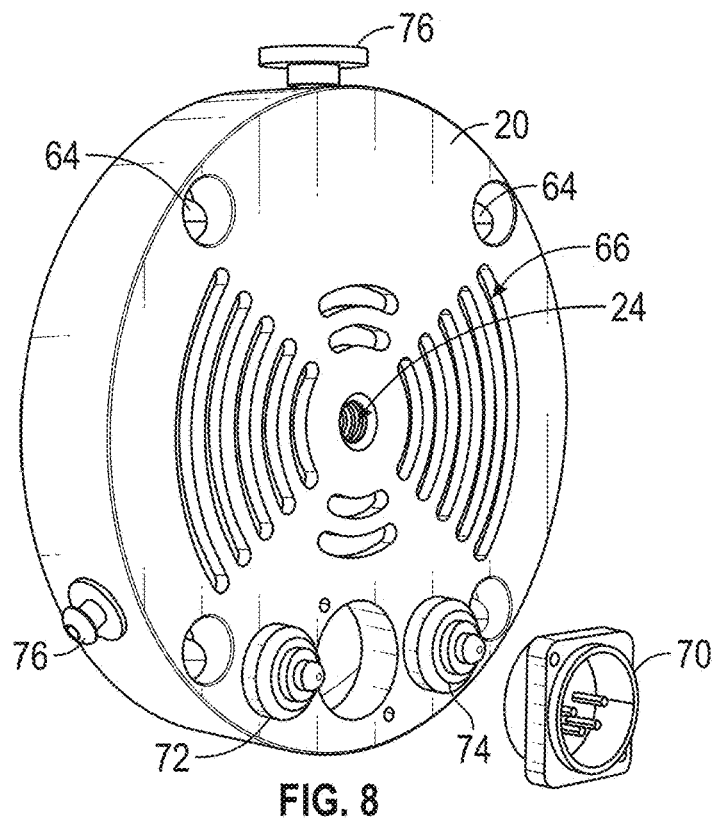
FIG. 8 shows a perspective view of a base mounting plate of a luminaire in accordance with the present disclosure.
Figure 9:
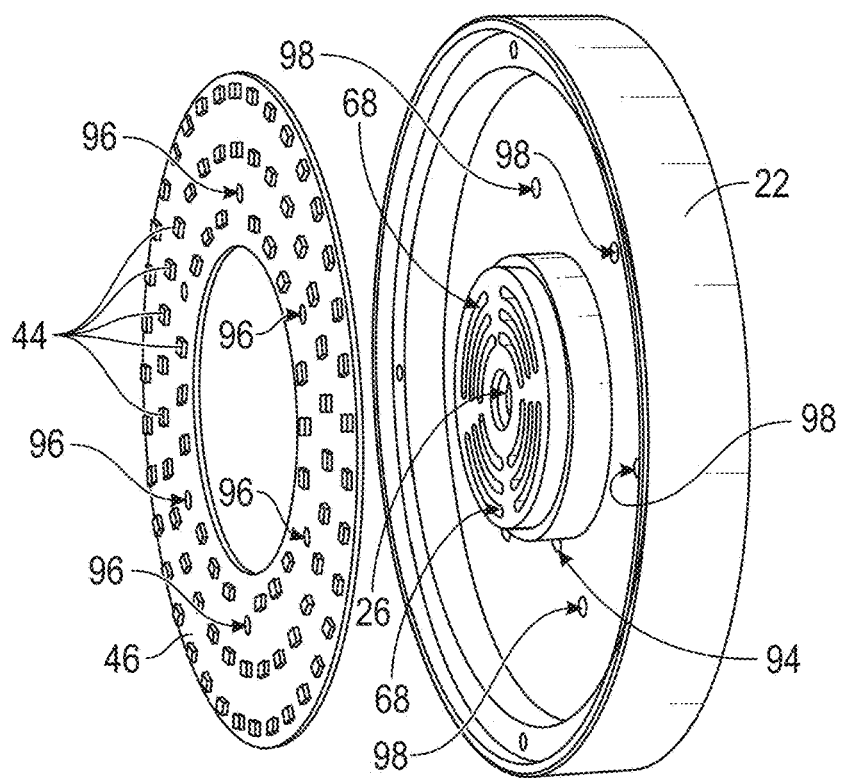
FIG. 9 shows a perspective view of a top mounting plate of a luminaire in accordance with the present disclosure.
Figure 10:
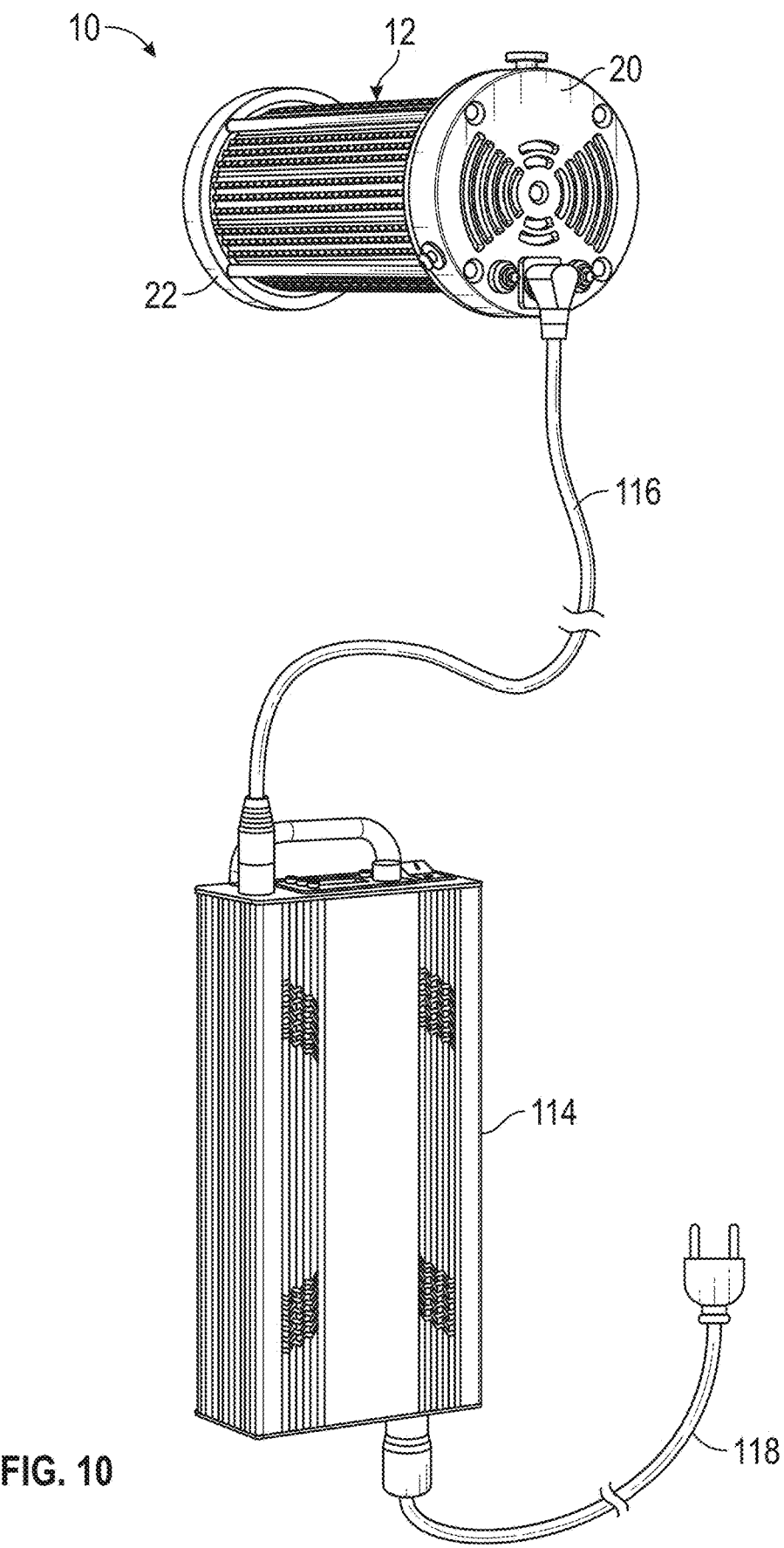
FIG. 10 shows a perspective view of a luminaire connected to a power supply unit in accordance with the present disclosure.
Figure 19:
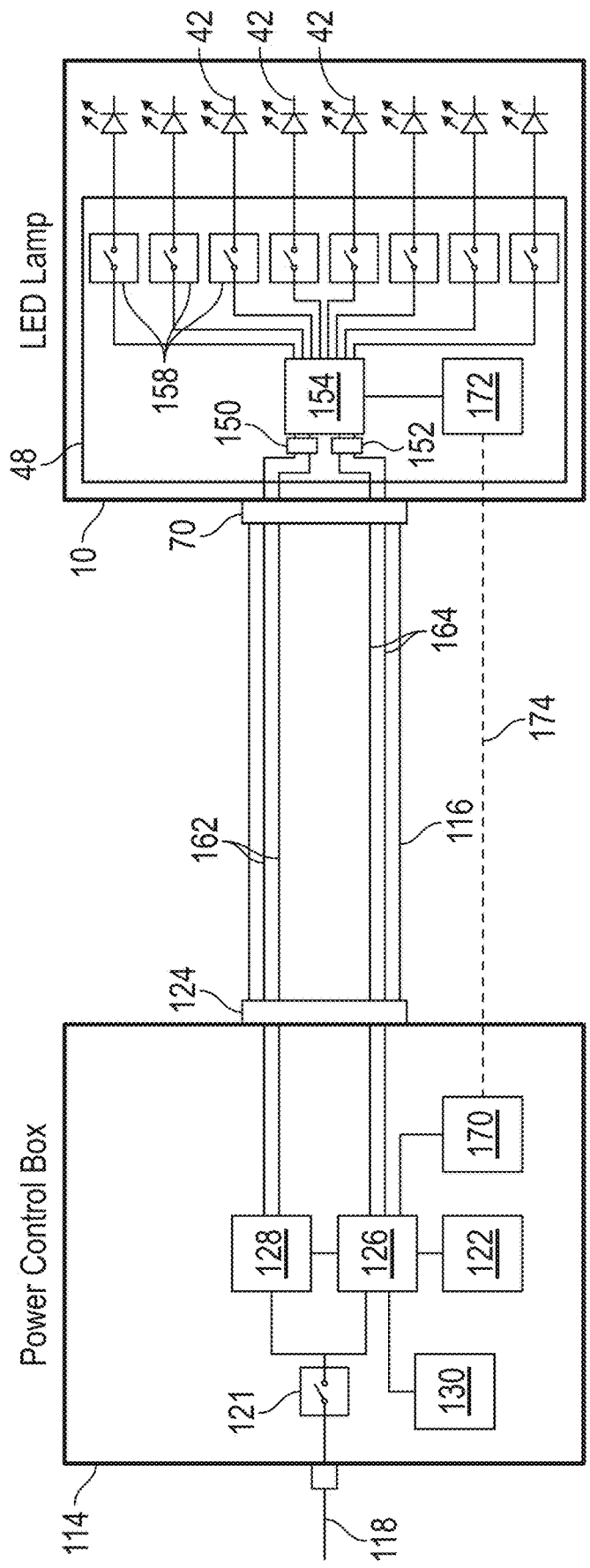
FIG. 19 shows a schematic diagram of a luminaire and power supply unit in accordance with the present disclosure.

A luminaire 10 and methods of using the luminaire 10 to provide lighting are provided. The luminaire 10 has multi-directional lighting controls for customizing lighting effects in multiple directions surrounding the luminaire 10. FIGS. 1-9 show one preferred embodiment of the luminaire 10 or components thereof. FIG. 10 shows a lighting system including the luminaire 10 and a power supply unit 114 connected to the luminaire 10 to supply power to the luminaire 10. FIG. 19 shows a schematic diagram of the lighting system, including both the luminaire 10 and the power supply unit 114. The luminaire 10 has an elongate body 12 having two opposing ends, which may include a base end 14 and an opposing top end 16, respectively. In a preferred embodiment that may optionally be utilized for multiple mounting configurations, a base mounting plate 20 is disposed at the base end 14 and a top mounting plate 22 is disposed at the top end 16. The body 12 includes the mounting plates and portions of the luminaire extending between the base mounting plate 20 and the top mounting plate 22. Each of the mounting plates may be utilized for mounting the luminaire 10 in different configurations, as described in detail below.

Figure 1:
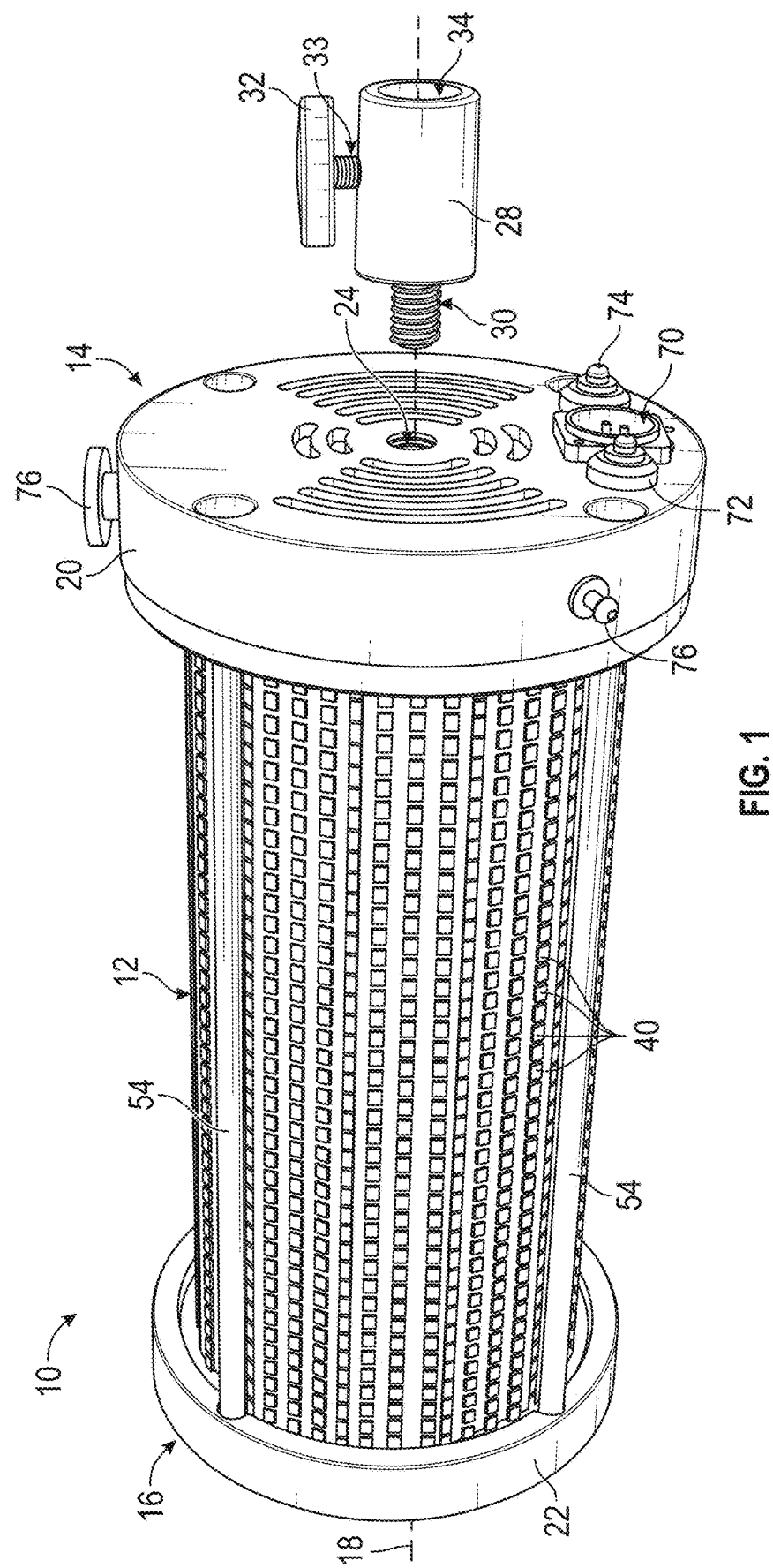
FIG. 1 shows a perspective view of a luminaire in accordance with the present disclosure.
Figure 2:
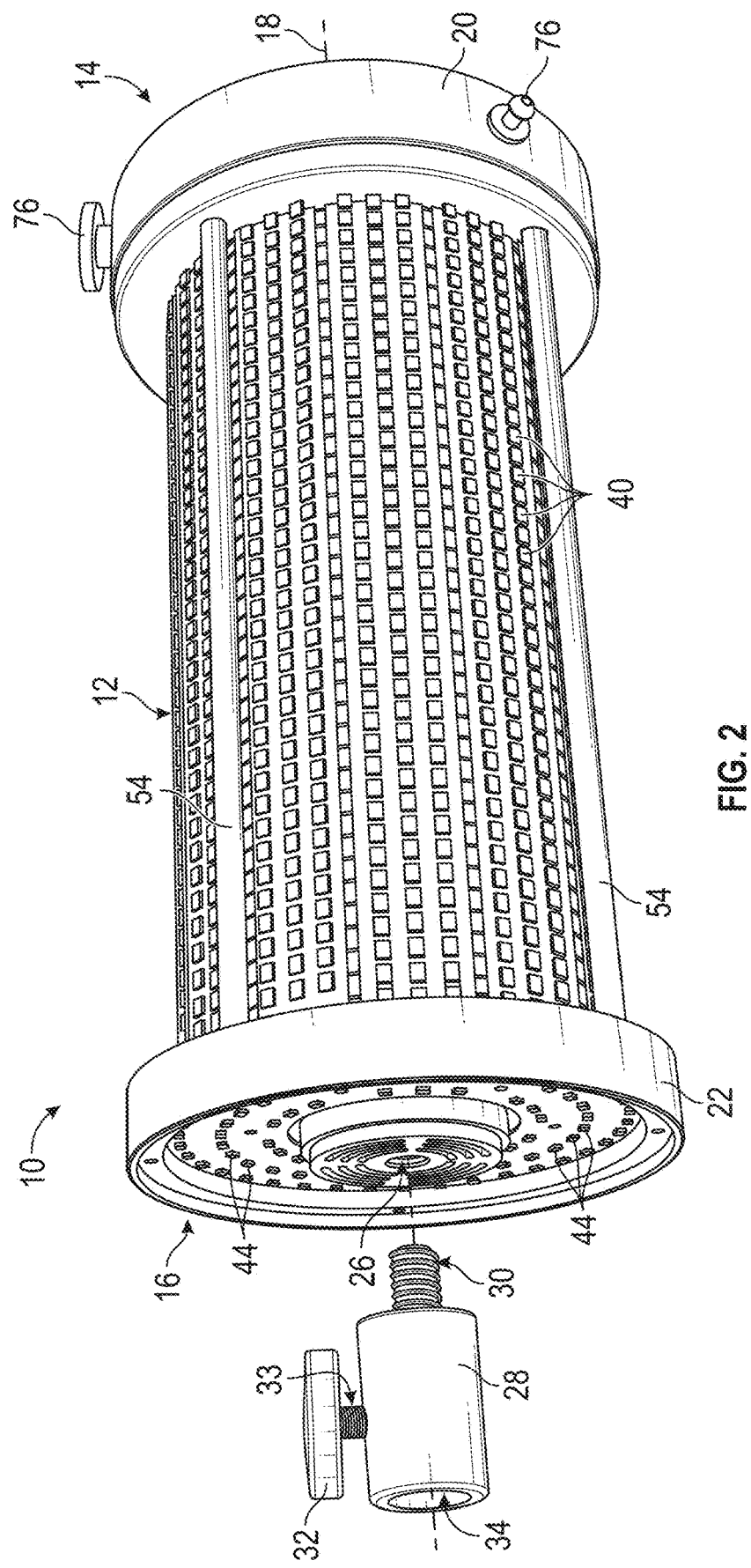
FIG. 2 shows a perspective view of a luminaire in accordance with the present disclosure.

The luminaire 10 includes a light source 40 configured to emit light radially from the elongate body 12 relative to a longitudinal axis 18 extending from the base end 14 to the top end 16 of the luminaire 10, as best seen in FIGS. 1-4. The light source may comprise a plurality of lights 40 distributed around an exterior of the body 12. The lights 40 are distributed both radially around the exterior of the body 12 and longitudinally along a length of the body 12 between the base mounting plate 20 and the top mounting plate 22, as best seen in FIGS. 1 and 2. The light source is capable of emitting light radially from the body 12 in a 360-degree arc about axis 18. The lights 40 are preferably LED (light-emitting diode) lights.

In a preferred embodiment, the light source 40 comprises a plurality of LED light zones 42 with each zone comprising a plurality of LED lights 40. Each light zone 42 extends longitudinally along a length of the body 12, and the plurality of light zones 42 in combination is configured to emit light radially from the body 12 in a 360-degree arc about the longitudinal axis 18. Each light zone 42 thus defines a discrete area of the body 12 of the luminaire 10 from which light can be emitted independently of the other light zones 42. Each light zone 42 is preferably defined by a plurality of LED lights 40 operably mounted onto an LED printed circuit board 42 (PCB). Each PCB 42 preferably has a shape that is generally an elongated rectangular shape. Each of the elongated PCBs 42 may be mounted onto the body 12 of the luminaire 10 so that the PCB 42 extends longitudinally along the exterior of the body 12 between the base mounting plate 20 and the top mounting plate 22. The base mounting plate 20 and top mounting plate 22 are preferably each disposed in a position that is generally perpendicular to axis 18, and the LED PCBs 42 are preferably each disposed in a position that is generally parallel to axis 18 with the plurality of PCBs 42 being disposed radially around axis 18. FIG. 5 shows an exploded view of the body 12, which preferably comprises a plurality of heat sink plates 36, and the PCBs 42 with LEDs 40 installed thereon. LED chips 40 may be soldered onto the PCBs 42. Preferably, the heat sink plates 36 may each have a polygonal outer shape so that the plurality of spaced plates 36 form a body 12 at least partially having a polyhedral shape. This configuration forms a plurality of flat outer surfaces of the body 12 onto which the PCBs 42 may be arranged in a generally cylindrical arrangement about axis 18. The PCBs 42 may be mounted onto the body 12 using screws or bolts or by otherwise fastening or attaching the PCBs 42 to the heat sink plates 36. In one preferred embodiment, as shown in FIGS. 1-5, twelve PCBs 42 are utilized to create twelve separate light zones 42 that radially cover the body 12 of the luminaire 10 so that light is emitted in a 360-degree arc around the luminaire 10 when all light zones 42 are utilized to emit light. In alternative embodiments, a different number of PCBs 42 may be utilized to define light zones 42 having different widths as the zones 42 cover the exterior of the body 12 in a radial arrangement.

Each of the plurality of individual light zones 42 is independently controllable so that a user can control the spread or coverage of light within a space around a complete 360-degree arc surrounding the luminaire 10, thereby allowing the space to be lighted in multiple customizable lighting patterns or arrangements using only a single fixture 10.

The luminaire 10 comprises a main printed circuit board (PCB) 48, which is preferably mounted on the body 12 of the luminaire 10. FIG. 3A shows the main PCB 48, and FIG. 3B shows the main PCB 48 operably connected to each of the LED light zone PCBs 42. The main circuit board 48 is designed to allow the user to individually control each of the light zones 42. The circuit board 48 comprises at least one central processing unit (CPU) or process controller, which is preferably a microcontroller 154, and a plurality of digital switches, each of which preferably comprises a transistor 158. In a preferred embodiment, each of the transistors 158 is a metal-oxide-semiconductor field-effect transistor (MOSFET). The main PCB 48 may have soldered connections to each of the light zone PCBs 42. In a preferred embodiment, as best seen in FIG. 3A, the main PCB 48 has a plurality of slotted openings 85 extending through the PCB 48. One end of each of the light zone PCBs 42 may be inserted through a respective one of the slots 85 and soldered to the main PCB 48 using soldering pads, as best seen in FIG. 3B. The main PCB 48 may include a plurality of soldering pads 156, and the ends of each of the light zone PCBs 42 may include a plurality of corresponding soldering pads 160 so that pads 156 and 160 may be connected to complete electrical circuits for each LED zone 42 during assembly of the luminaire 10. Alternatively, connectors 156 and 160 may comprise separate wires, pin connectors, or other suitable types of connectors.

Figure 18:
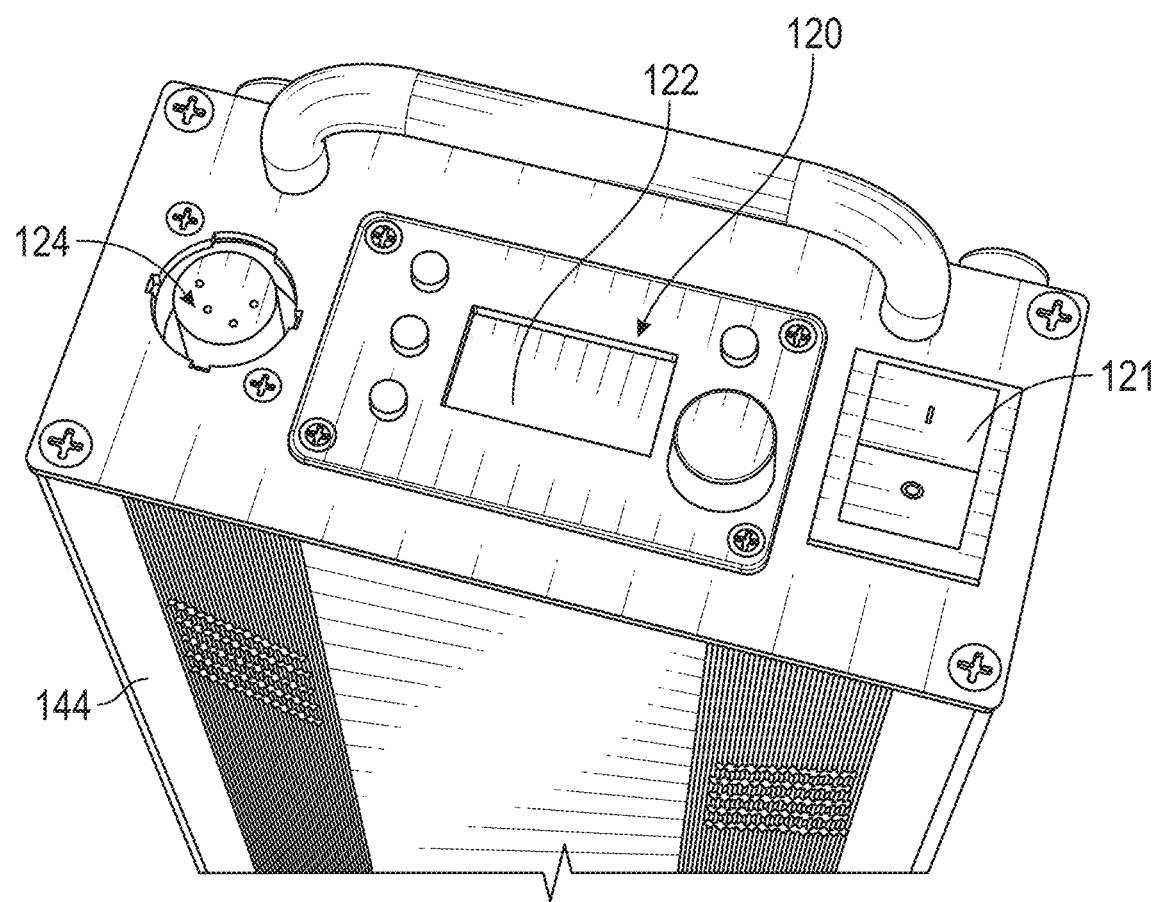
FIG. 18 shows a partial perspective view of a power supply unit for supplying power to a luminaire in accordance with the present disclosure.

A power supply cable 116 connects the luminaire 10 to a power supply unit 114 that supplies power to the luminaire 10. The power supply unit 114 is external to the luminaire 10, as best seen in FIG. 10, and connected via cable 116. The power supply cable 116 may be plugged into an electrical outlet 70 on the luminaire 10, which is preferably located on the base mounting plate 20 of the luminaire 10, to provide power to lights 40 of each of the light zones 42. The power supply unit 114 may be plugged into mains AC (alternating current) power via a main AC power cord 118 to supply power to the unit 114. The power supply unit 114 includes a control circuit 126 and a voltage regulator 128. FIG. 18 shows a close-up view of a control panel 120 on the exterior of the power supply unit 114 for operating the luminaire 10. FIG. 19 shows a schematic diagram of the luminaire 10 and the power supply unit 114. The power supply unit 114 converts mains AC power to low-voltage regulated DC (direct current) power for powering the lights 40. The control circuit 126 is configured to convert and regulate power to the luminaire 10 and to control operation of the luminaire 10. The power supply unit 114 may include a fan 130 to cool internal components of the unit 114 and may have external vents to facilitate air movement by the fan 130 into and out of the interior of the unit 114. The power supply unit 114 may have an external case, and the control circuit 126, voltage regulator 128, and fan 130 may be disposed within the interior of the unit 114. The power supply unit 114 may have an external on/off switch 121 for switching the power on and off to both the power supply unit 114 and the luminaire 10. The power supply unit 114 may also have a luminaire connection outlet 124 designed to plug the power supply cable 116 into the power supply unit 114.

As best seen in FIG. 18, the power supply unit 114 may have an external control panel 120, which may include a digital display 122. The control panel 120 may also include various controls for controlling optional functions of the luminaire 10. For instance, the control circuit 126 may be configured to provide dimming for the lights 40, settings for which may be displayed on the display screen 122, as well as programmable lighting effects, such as blinking, pulsing, flickering, or other effects. A user may use the control panel 120 to change values relating to such effects, which may be displayed on the display screen 122. The control circuit 126 may also be configured to connect to a DMX controller, which is a digital network communication standard commonly used for theatrical and cinematic lighting applications, to control multiple luminaires 10 and to custom program dimming values of each luminaire 10. The control circuit 126 may also be configured to connect to a WiFi network, which may allow remote control of the luminaire 10 through a mobile application.

As shown in FIG. 19, the power supply cable 116 preferably includes both power supply lines 162 and one or more data lines 164. Alternatively, the power supply lines 162 and the data lines 164 may be disposed within separate cables. The power supply lines 162 and data lines 164 are operably connected to the main circuit board 48 when the luminaire 10 is plugged into the power supply unit 114. In a preferred embodiment, the power supply cable 116 comprises four separate lines contained within a single cable 116, including two DC power lines 162 and two data lines 164. The microcontrollers 154 are configured to distribute and regulate power independently to each of the light zones 42 using the plurality of digital switches 158 or transistors based on data signals transmitted from the power supply unit 114 via the one or more data lines 164 of the power supply cable 116. The microcontrollers 154 receive the data signals based on user input to the power supply unit 114 via the control panel 120 and then controls the transistors 158 to regulate power to each of the light zones 42 in order to individually control dimming of each of the separate light zones 42. FIG. 19 illustrates an example embodiment of a luminaire 10 having a single microcontroller 154 used with eight switches 158 that independently control power to eight separate light zones 42. It should be understood by one of skill in the art that the number of microcontrollers 154, digital switches 158, and individual light zones 42 may be varied and still fall within the scope of the present disclosure.

Figure 7:
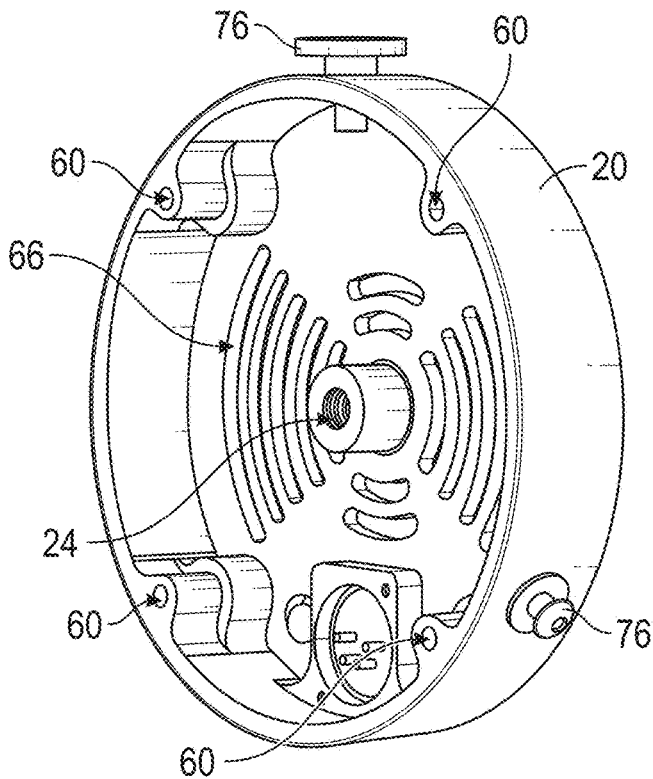
FIG. 7 shows a perspective view of a base mounting plate of a luminaire in accordance with the present disclosure.

The main circuit board 48 includes a connector 150 for connecting the power lines 162 to the PCB 48 and a connector 152 for connecting the data lines 164 to the PCB 48. FIGS. 7 and 8 show opposing sides of the base mounting plate 20. In a preferred embodiment, electrical outlet 70 is disposed on the base mounting plate 20 and is designed to removably attach the power supply cable 116 to the electrical outlet 70 to supply power to each of the light zones 42. The electrical outlet 70 may have a socket and an arrangement of prongs that are compatible with a terminal end of the power supply cable 116 so that the cable 116 may be plugged into the outlet 70 and remain in place, as best seen in FIG. 10. On the interior side of the electrical outlet 70, the prongs may be electrically wired to connectors 150 and 152 on the main PCB 48 to distribute power to the light zone PCBs 42 to provide power to the luminaire 10, as well as to a fan 38 designed to cool the body 12 of the luminaire 10, and to transmit data signals to the microcontrollers 154.

FIGS. 3A and 3B show an example embodiment of a circuit board 48 that may be utilized within the luminaire 10 to provide independent lighting control simultaneously to a plurality of separate light zones 42. In this example embodiment, the luminaire 10 has twelve light zones 42 each having two colors. In this example case, each light zone 42 has orange and blue LEDs 40 for changing light color between warm and cold. Thus, in this example there are two separate LED circuits for each zone 42, one circuit for controlling each of the two colors. As such, each light zone PCB 42 has four connectors 160, and the main PCB 48 also has four corresponding connectors 156 for each zone 42, to provide positive and negative connections for each of the two LED power circuits. In other embodiments, it should be understood that each light zone 42 may include any number of colors, and the luminaire 10 and circuit board 48 may be modified to control any number of color channels for each zone 42 independently. For instance, for full RGB (red-green-blue) color control, three color channels may be utilized for each zone 42. In this case, the main circuit board 48 and LED boards 42 may each have six connectors 156, 160 for each zone 42. In one embodiment, each individual LED chip 40 may have RGB diodes so that a full spectrum of colors is possible utilizing three color channels for each zone 42. In the example embodiment shown in the figures, the main PCB 48 also includes two microcontrollers 154. It should be understood by one of skill in the art that the luminaire 10 includes at least one microcontroller 154 but may include additional microcontrollers 154 as needed depending on the number of light zones 42 and color channels utilized by the luminaire 10 and the design of the microcontroller 154.

In a preferred embodiment, the power supply cable 116 includes only two DC power lines 162 (one positive and one negative) for powering the entire luminaire 10, including all lights 40 in all of the individually controllable light zones 42. Thus, the power supply cable 116 connecting the luminaire 10 to the power supply unit 114 does not include individual circuit wiring for separately powering each of the light zones 42. Power and dimming of the separate zones 42 are individually controllable by utilizing one or more data lines 164 contained within the power supply cable 116, and preferably two data lines 164, which provide a differential pair of data signals from the power supply unit 114 to the luminaire 10. The system may utilize differential signaling 164 in combination with a single power supply 162 to the entire luminaire 10 in order to independently control a large number of separate lighting zones 42, each of which essentially functions as an independent fixture, using a small number of lines 162, 164, thereby minimizing the size and complexity of power supply cable 116 and allowing cable 116 to be universally adaptable to a luminaire 10 having any number of separate light zones 42. In addition, this configuration allows the length of cable 116 to be extended for maximum installation flexibility without signal degradation. The system may utilize a suitable communications protocol utilizing a standard such as RS-485 to send digital data messages (byte info) via the data lines 164 from the power supply unit 114 to the main PCB 48 based on user input to control aspects of the lighting, such as color and dimming. The microcontrollers 154 control the voltage on the digital switches 158 based on the data messages, which in turn controls the power transmitted to each individual light zone 42. The one or more data lines 164 may comprise wires, ethernet cables, or other physical lines suitable for providing a communication path for facilitating the transmission of data between the power supply unit 114 and the process controller 154. The data may be converted into binary code and transmitted via the one or more data lines 164 as pulses of electrical current.

In an alternative embodiment, the data that allows the process controller 154 to independently control the light zones 42 may be transmitted wirelessly. FIG. 19 illustrates components for both wired and wireless data transmission. The luminaire 10 and power supply unit 114 may optionally include components for both wired and wireless data transmission or for only wired or wireless transmission. In this embodiment, the power supply unit 114 further comprises a wireless data transmitter 170 operably connected to the control circuit 126, and the luminaire 10 further comprises a wireless receiver operably connected to the main circuit board 48. The transmitter 170 is configured to wirelessly transmit data signals 174, and the receiver is configured to receive the data signals 174 from the data transmitter 170. The process controller 154 is configured to regulate power independently to each of the light zones 42 based on the data signals 174 transmitted wirelessly from the transmitter 170 to the receiver 172. In this embodiment, the power supply cable 116 may include only power lines 162.

By utilizing the present configuration for the luminaire 10, power supply, and communications protocols, the present luminaire 10 allows a user to control the spread or coverage of light within a space around a complete 360-degree arc surrounding the luminaire 10, which allows a space to be lighted in multiple ways using only a single fixture. Individually controllable light zones 42 also allow for special effects to be achieved using a single fixture rather than multiple fixtures. These features are particularly advantageous in theatrical and cinematic applications. For instance, in a scene in which two actors are present, a single fixture 10 may be used to simultaneously provide different lighting effects for each of the actors, each of which may be static or dynamic lighting effects. In addition, a single fixture 10 may be used to provide various other types of lighting effects, which may be programmed by the user, to provide patterns of light, such as a revolving pattern or any other desirable programmable sequence of lights of varying color and/or brightness.

In a preferred embodiment, the luminaire 10 is configured to allow mounting in various configurations, which may optionally include lighting modifiers 102. Each of the different mounting configurations described herein is an optional feature that may be utilized in combination with the multi-directional lighting controls to maximize the flexibility with which the luminaire 10 may be utilized to create various lighting effects. The luminaire 10 with multi-directional lighting controls may be utilized to create 360-degree lighting effects independent of any specific mounting configuration and may, alternatively, be used as a free-standing fixture that is not mounted onto any structure.

Figure 3:
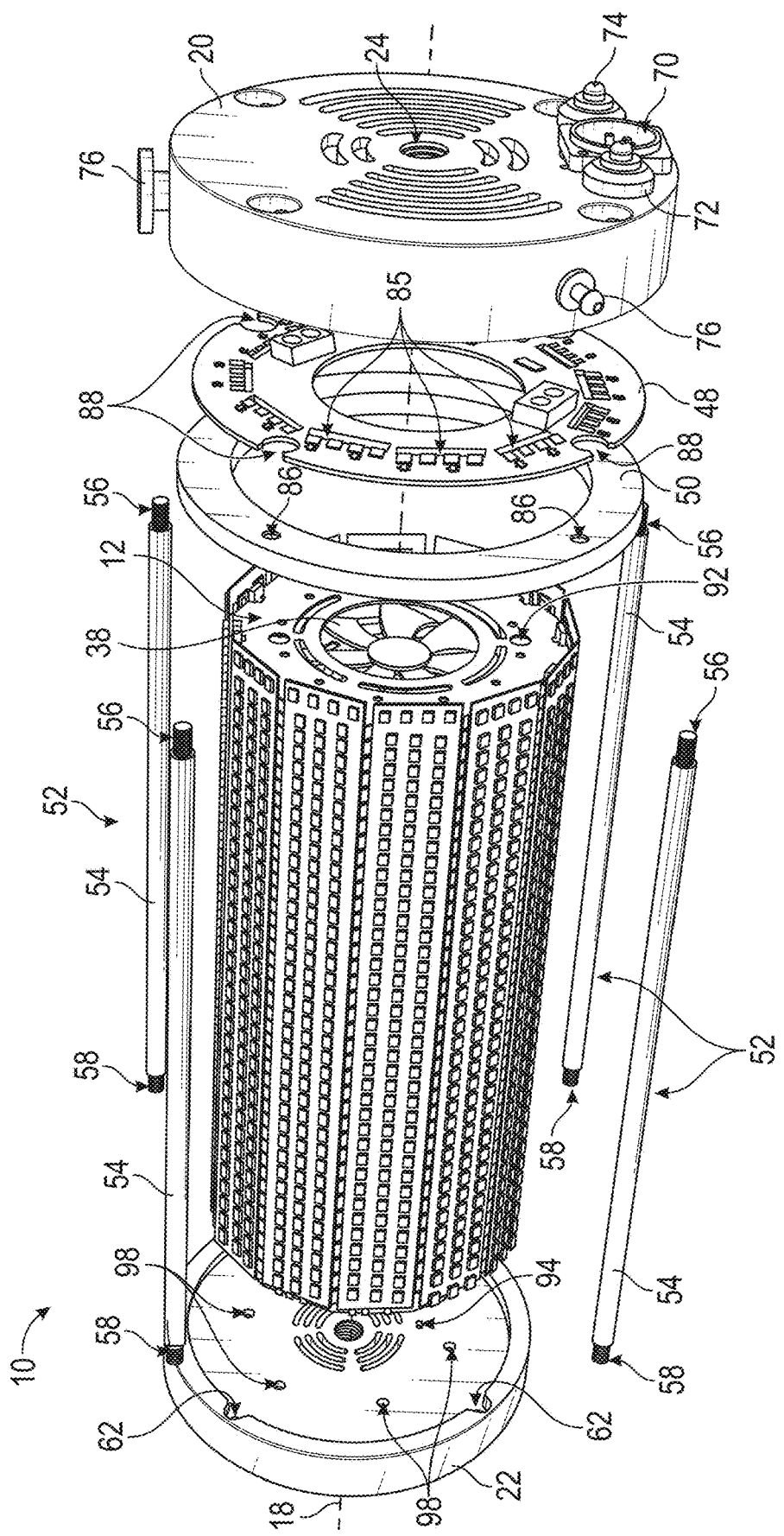
FIG. 3 shows an exploded view of a luminaire in accordance with the present disclosure.
Figure 3A:
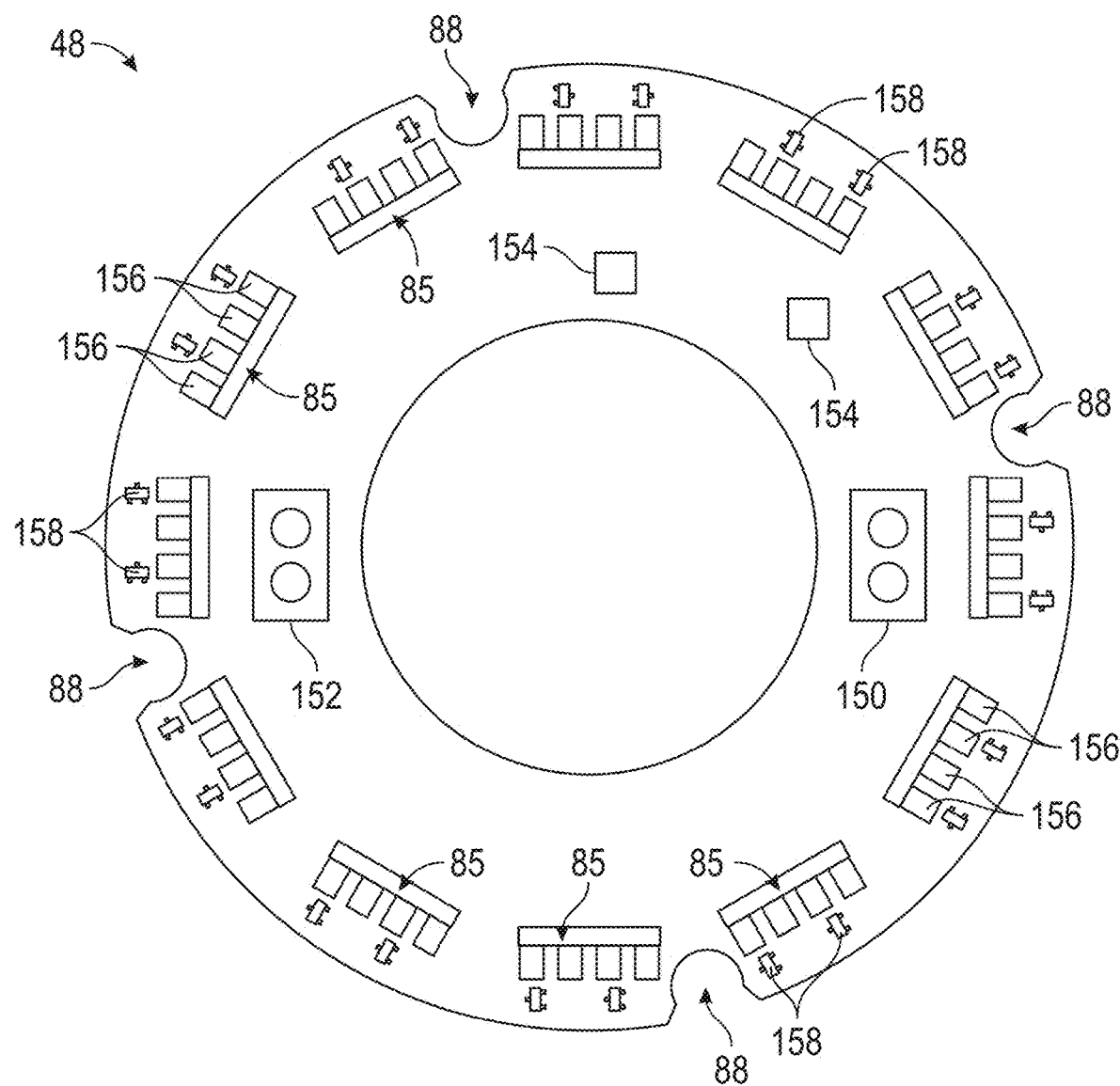
FIG. 3A shows a top plan view of a circuit board for a luminaire in accordance with the present disclosure.
Figure 3B:
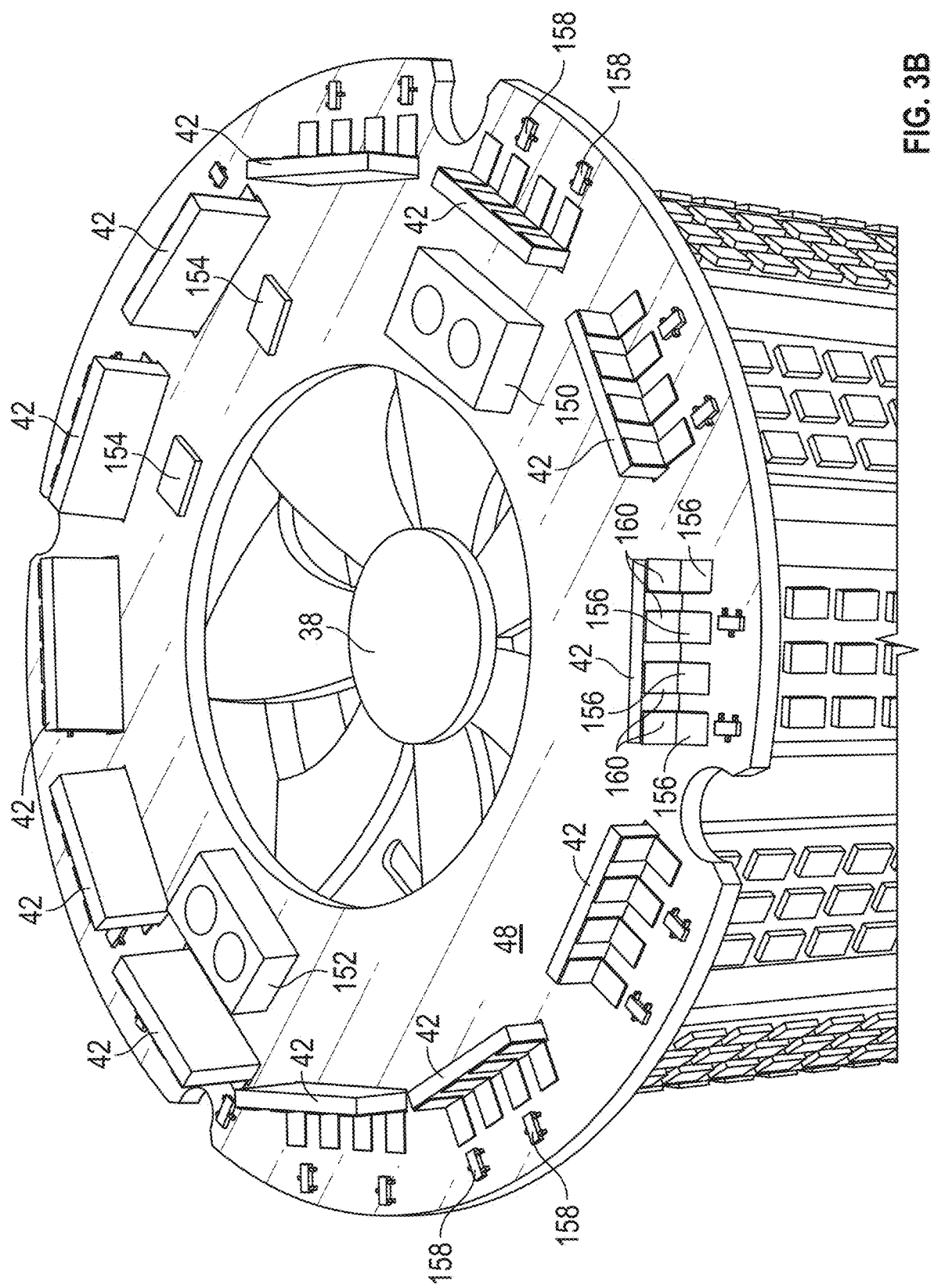
FIG. 3B shows a partial perspective view of a circuit board operably connected to a luminaire in accordance with the present disclosure.
Figure 4:
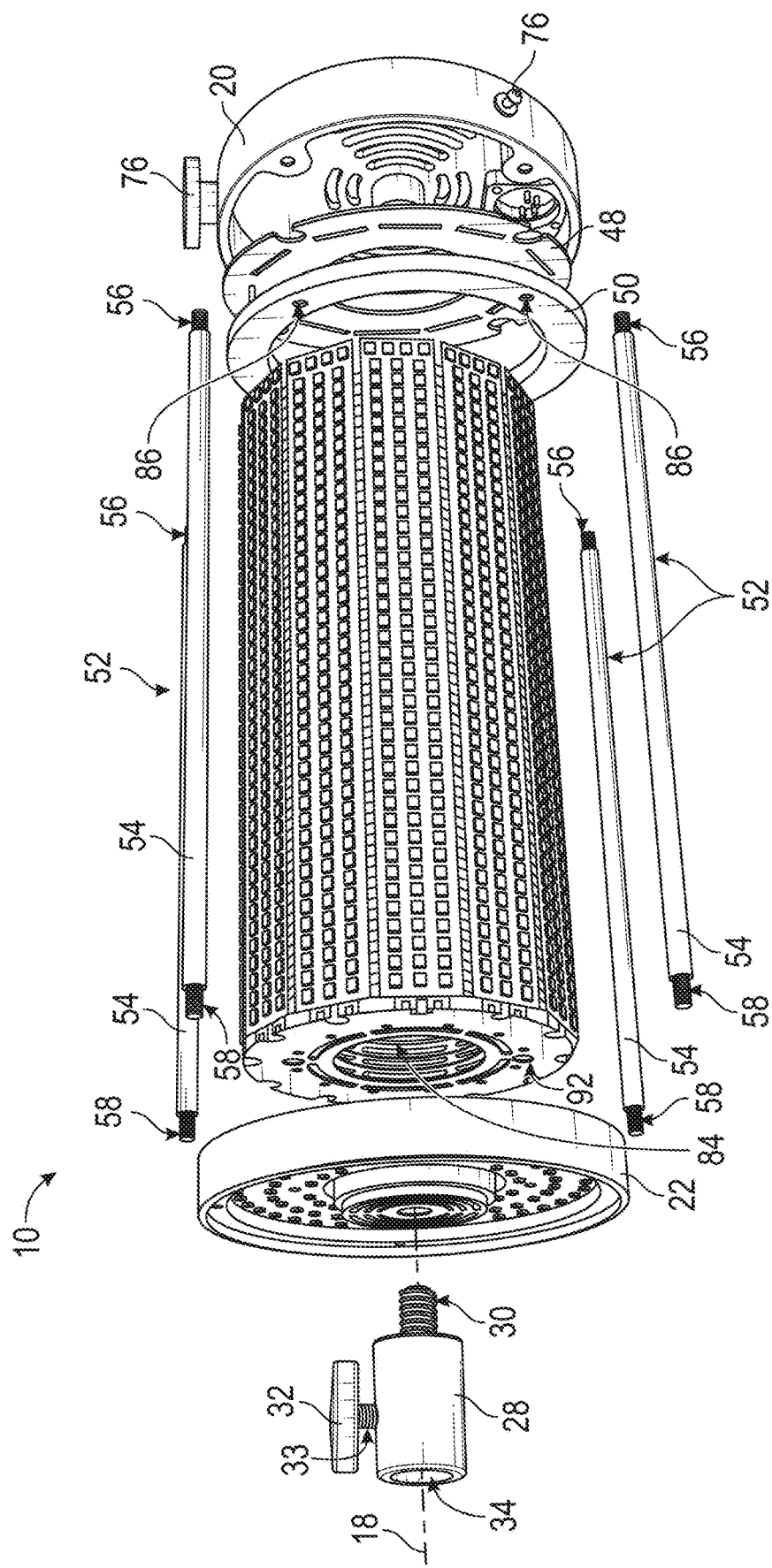
FIG. 4 shows an exploded view of a luminaire in accordance with the present disclosure.
Figure 5:
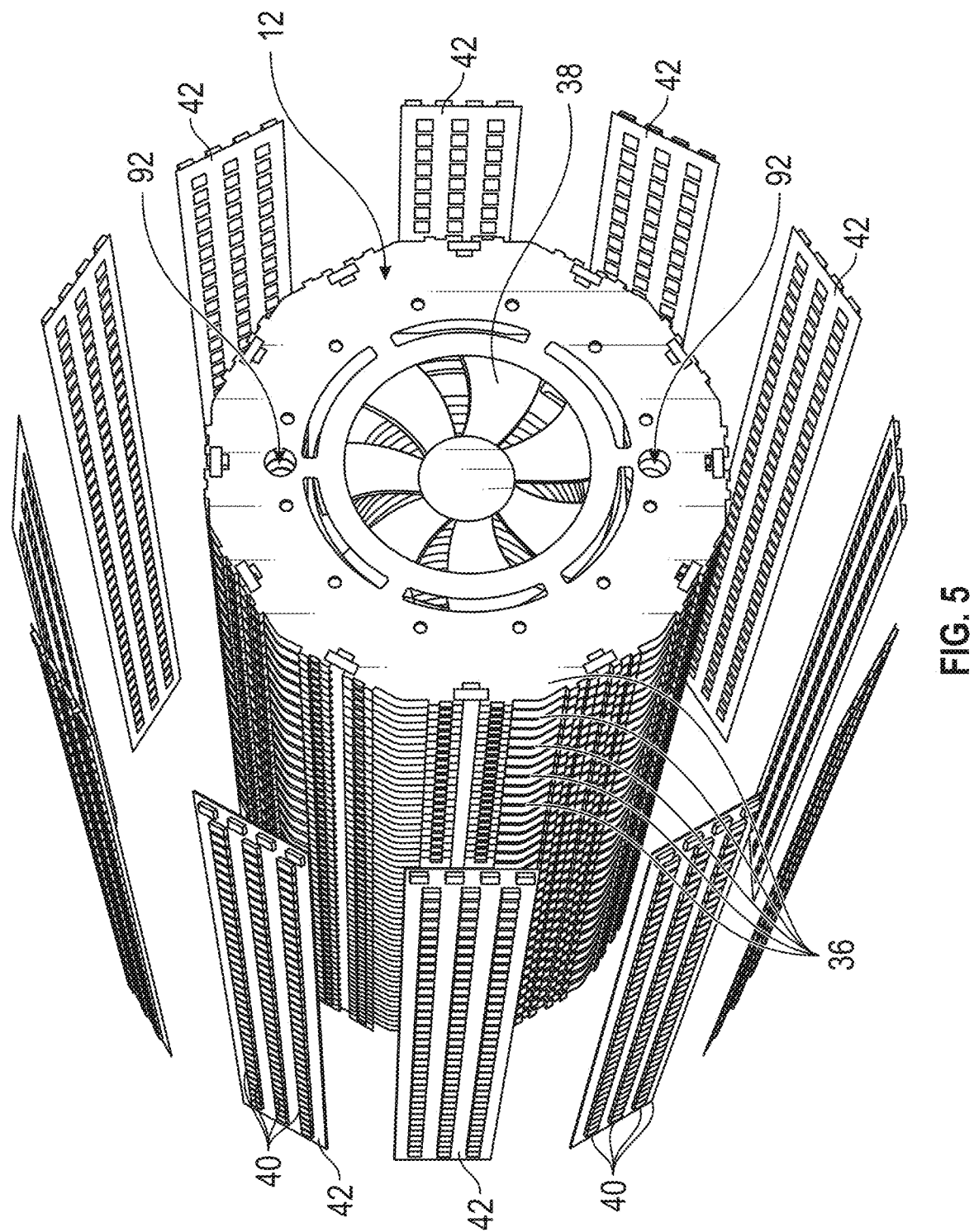
FIG. 5 shows an exploded view of a luminaire in accordance with the present disclosure.

FIGS. 1 and 2 show perspective views of the luminaire 10, and FIGS. 3-5 show exploded views of certain components of the luminaire 10. In a preferred embodiment, the base mounting plate 20 and the top mounting plate 22 may each have a generally circular shape and generally parallel exterior sides, which may be generally perpendicular to a longitudinal axis 18 that extends from the base end 14 to the top end 16 of the luminaire 10. In a preferred embodiment, each of the base mounting plate 20 and the top mounting plate 22 is designed to be individually mounted onto a mounting structure 106 to support the luminaire 10. Because the base mounting plate 20 and the top mounting plate 22 are designed to be mounted individually, the luminaire 10 may thus be mounted onto the mounting structure 106 using either one of the base mounting plate 20 or the top mounting plate 22 to support the luminaire 10 on the mounting structure 106. Either mounting plate 20 or 22 may be used individually without the other mounting plate to provide adequate mounting support for the luminaire 10. The luminaire 10 may be operated to provide lighting regardless of how the luminaire 10 is mounted, or whether the luminaire 10 is mounted, onto a mounting structure 106. For instance, the luminaire 10 is operable when either one of the base mounting plate 20 or the top mounting plate 22 is mounted onto a mounting structure 106, or when neither the base mounting plate 20 nor the top mounting plate 22 is mounted onto the mounting structure 106, or when both the base mounting plate 20 and the top mounting plate 22 are mounted onto the mounting structure 106, in which case the mounting structure may optionally include two separate structures to which each respective mounting plate 20, 22 is mounted. A specific mounting configuration is not required for the luminaire 10 in order to operate the luminaire 10 to provide lighting because electrical power may be delivered to the luminaire 10 regardless of whether or how the luminaire 10 is mounted.

Figure 12:
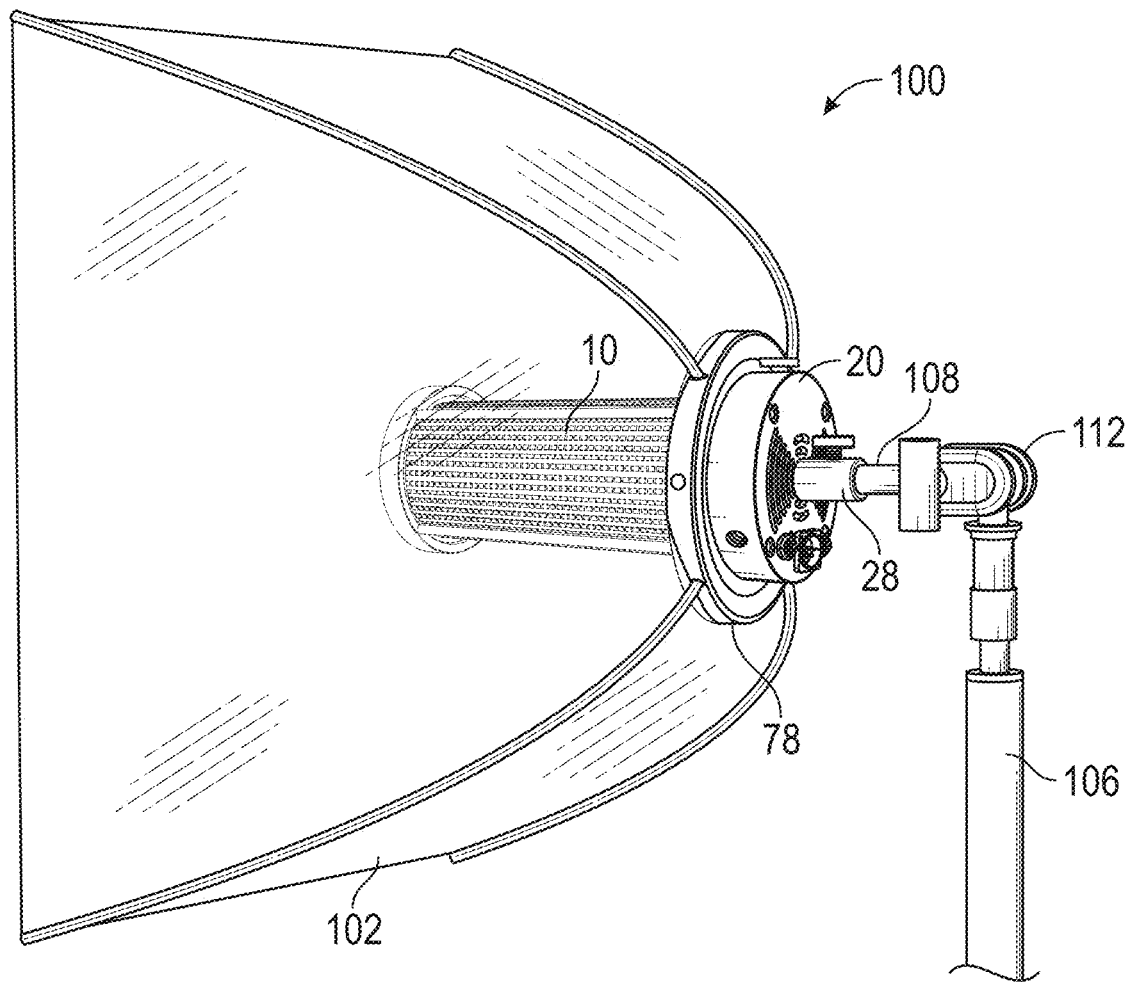
FIG. 12 shows a perspective view of a luminaire mounted onto a stand with a lighting modifier in accordance with the present disclosure.
Figure 14:
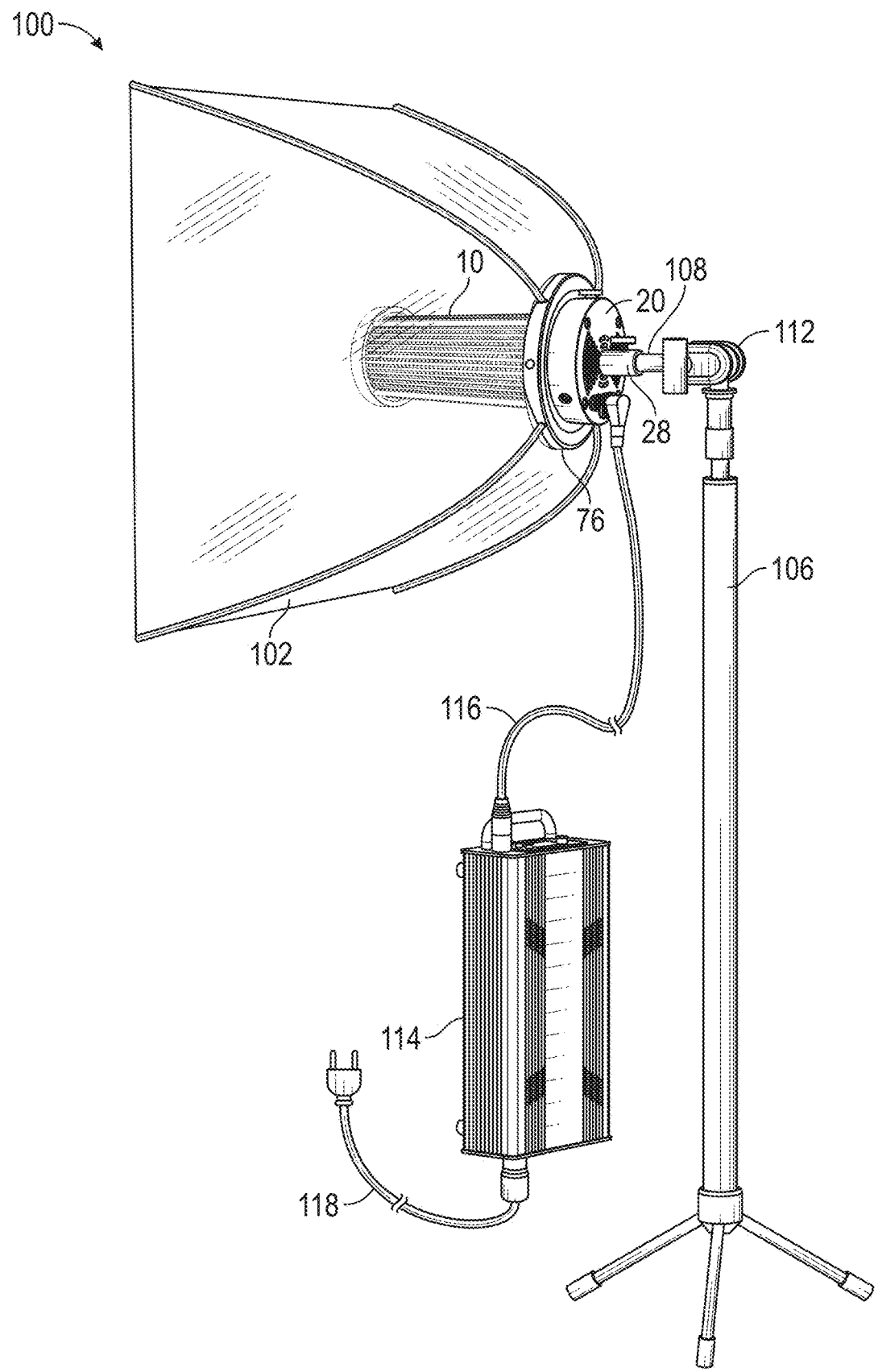
FIG. 14 shows a perspective view of a luminaire connected to a power supply unit and mounted onto a stand with a lighting modifier in accordance with the present disclosure.
Figure 15:
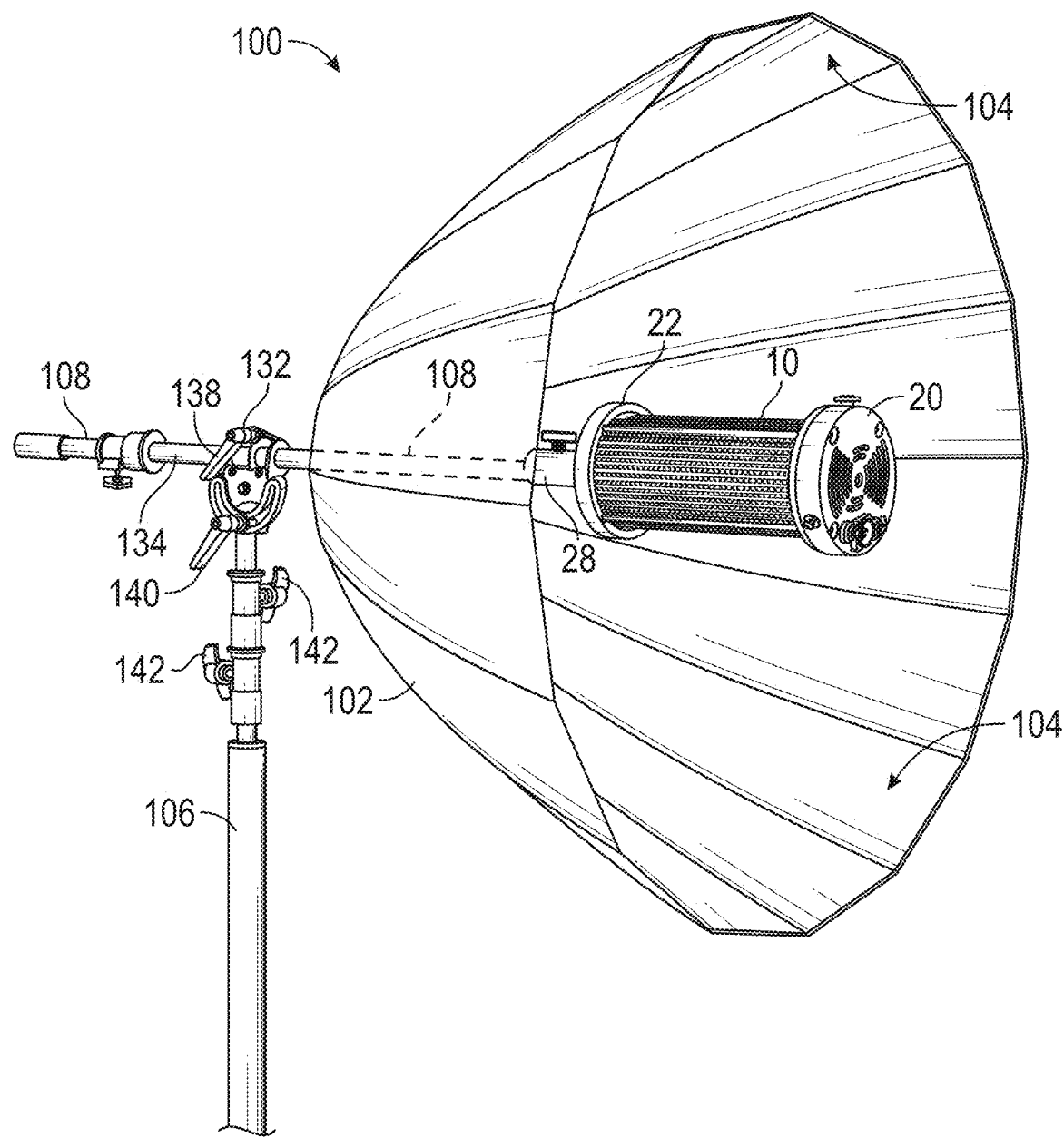
FIG. 15 shows a front perspective view of a luminaire mounted onto a stand with a lighting modifier in accordance with the present disclosure.
Figure 17:
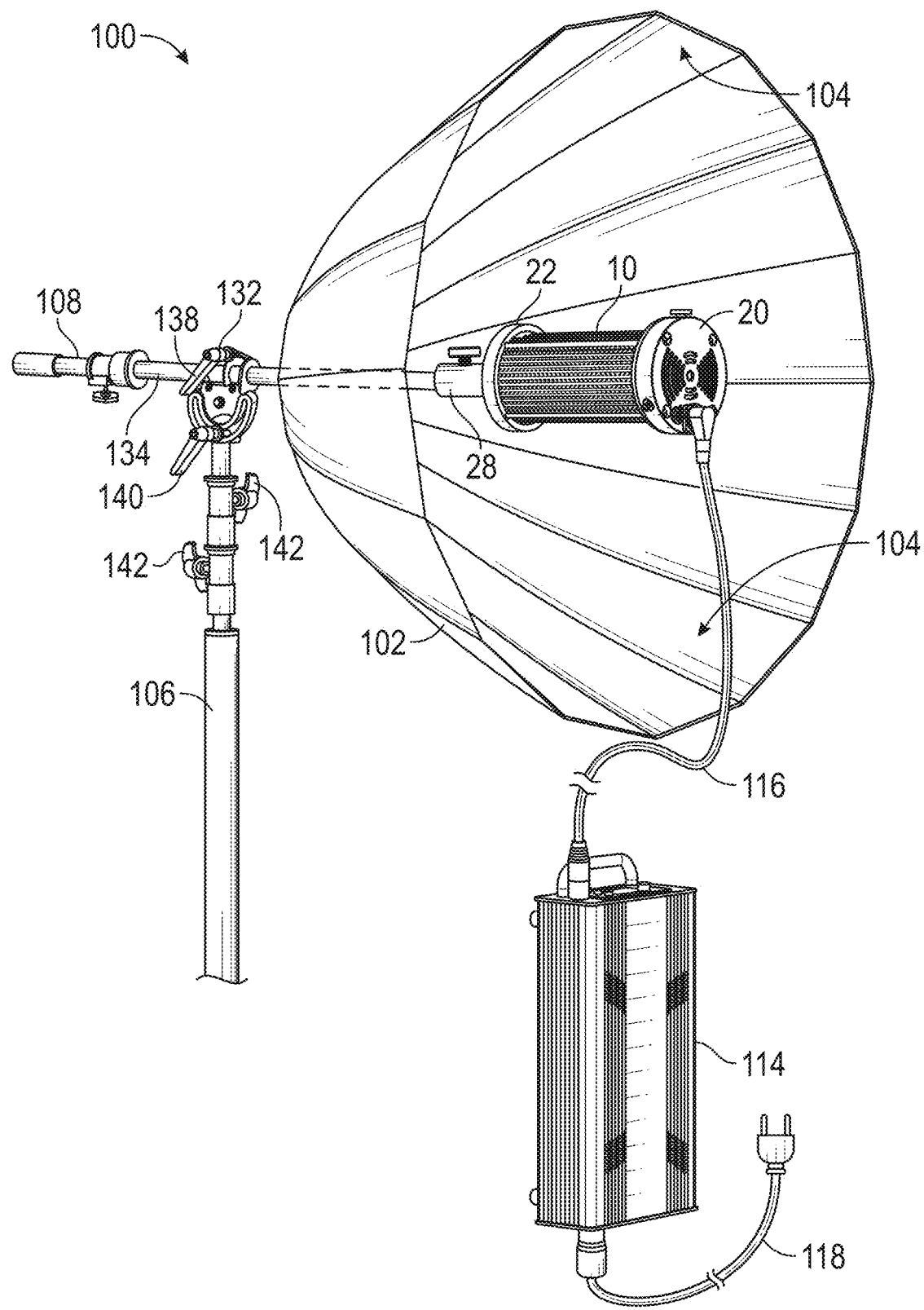
FIG. 17 shows a front perspective view of a luminaire connected to a power supply unit and mounted onto a stand with a lighting modifier in accordance with the present disclosure.

The mounting structure used to support the luminaire 10 may include a mounting arm 108 that is attached to a stand 106 that rests on the ground and supports the luminaire 10 in an elevated position above the ground. The mounting arm 108 and stand 106 may also be used to support a lighting modifier 102. Alternatively, the mounting structure may comprise a structure designed to be handheld by a user or a structure mounted onto a wall or other fixed structure. FIGS. 12 and 14 show the base mounting plate 20 of the luminaire 10 mounted onto a mounting arm 108 of a stand 106, and FIGS. 15 and 17 show the top mounting plate 22 of the luminaire 10 mounted onto a mounting arm 108 of the stand 106. As best seen in FIGS. 14 and 15, the luminaire 10 may be designed so that the mounting arm 108 of the stand 106 is generally aligned with longitudinal axis 18 when the base mounting plate 20 is mounted onto the mounting arm 108 or when the top mounting plate 22 is mounted onto the mounting arm 108.

Figure 6:
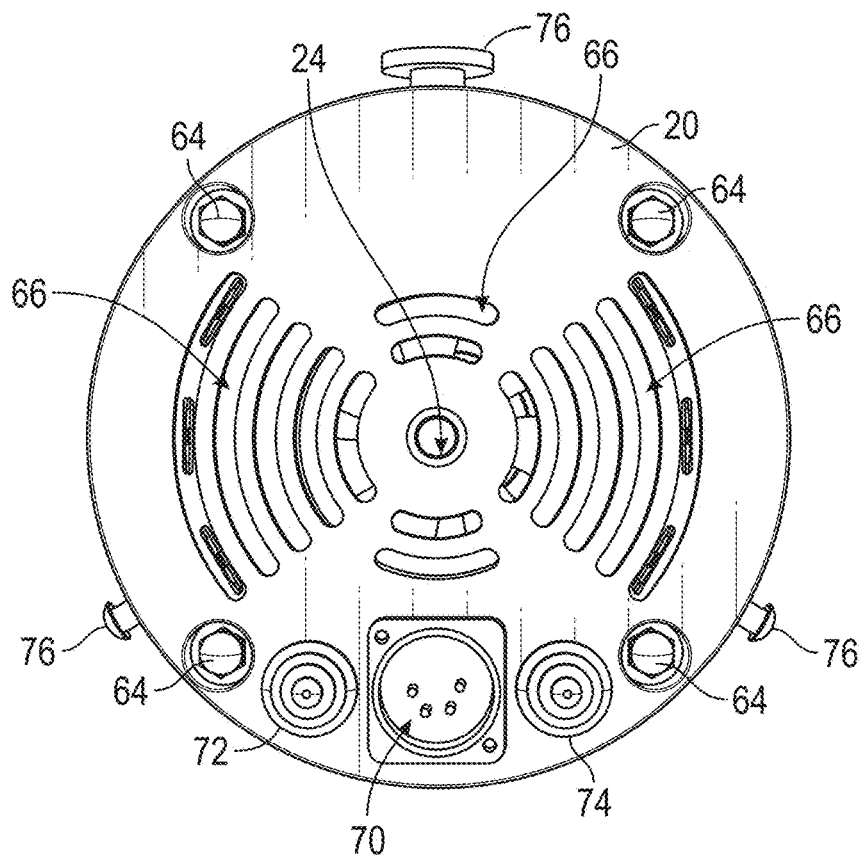
FIG. 6 shows an end view from a base end of a luminaire in accordance with the present disclosure.

In an optional embodiment, the luminaire 10 may include a second light source 44 configured to emit light in an axial direction relative to axis 18 from an exterior side of the top mounting plate 22. The second light source may comprise a plurality of lights 44 disposed on the exterior side of the top mounting plate 22, as best seen in FIG. 2. The second plurality of lights 44 may also be LED lights or other suitable types of lights. The second set of lights 44 may essentially function in the same manner as one of the light zones 42 disposed radially around the body 12 of the luminaire 10 and thus may also be independently controllable in the same manner. Thus, the first plurality of lights 40 and the second plurality of lights 44 can be activated independently of each other so that light can be emitted by the luminaire 10 from any of the individual light zones 42 and/or from the second plurality of lights 44 simultaneously. Each set of lights 40 and 44 may be optionally separately wired to on/off switches 72 and 74, respectively, which may be located on the base mounting plate 20 of the luminaire 10. As best seen in FIGS. 1 and 6, each of the switches 72, 74 may be in the form of a push-button that may be pushed to allow activation or to deactivate lights 40 and 44, respectively.

To facilitate mounting the luminaire 10 onto a mounting structure such as the mounting arm 108 of a stand 106, the base mounting plate 20 and the top mounting plate 22 may each include a fastener designed to separately mount each respective mounting plate 20, 22 onto the mounting structure 106 to fixedly secure the luminaire 10 to the mounting structure. Each fastener may include a threaded section 24, 26 having screw threads, in which case the mounting structure may optionally include corresponding screw threads that are compatible with screw threads 24 or 26. Alternatively, each mounting plate 20 and 22 may include other suitable types of fasteners, such as fastener 32 utilized in combination with a socket 34, for mounting either mounting plate 20, 22 onto the mounting structure 106 so that the luminaire 10 is secured to the mounting structure 106 in a fixed position. The luminaire 10 may be fixedly secured to the mounting structure 106 for normal use utilizing only one of the mounting plates 20, 22. Each respective mounting plate 20, 22 may be designed to be mounted directly onto the mounting structure, or the luminaire 10 may optionally include a connector 28 designed to connect to either the base mounting plate 20 or to the top mounting plate 22 in order to mount either mounting plate 20, 22 onto the support structure to support the luminaire 10. The connector 28 may be further designed to attach to the mounting structure to mount the luminaire 10.

Figure 11:
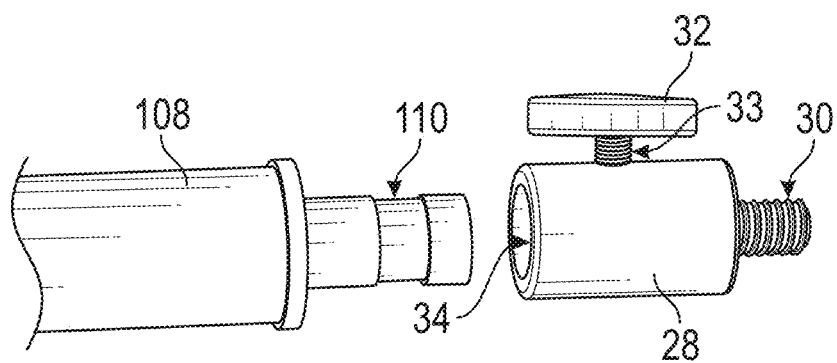
FIG. 11 shows a perspective view of a connector of a luminaire and a partial view of a mounting arm of a stand in accordance with the present disclosure.

As best seen in FIGS. 1 and 2, the base mounting plate 20 may have a first threaded section 24, and the top mounting plate 22 may have a second threaded section 26. Threaded sections 24 and 26 may optionally be used to mount the luminaire directly onto a mounting structure such as a stand 106. Alternatively, the luminaire 10 may further comprise a connector 28 designed to connect either mounting plate 20, 22 to a stand 106 or other mounting structure. In this case, the connector 28 may have a third threaded section 30 at a first end of the connector 28 and a socket 34 at a second end of the connector 28. The third threaded section 30 has screw threads that are compatible with both the first threaded section 24 of the base mounting plate 20 and the second threaded section 26 of the top mounting plate 22. Thus, the connector 28 may be removably secured either to the base mounting plate 20 or to the top mounting plate 22 by mating the third threaded section 30 of the connector 28 with either the first threaded section 24 of the base mounting plate 20 or the second threaded section 26 of the top mounting plate 22, depending on a desired mounting configuration. The third threaded section 30 may have male helical screw threads, and each of the first 24 and second 26 threaded sections may have female helical screw threads designed to mate with the male helical screw threads for fastening the connector 28 to one of the mounting plates 20, 22. The connector 28 may be removed from either mounting plate 20, 22 by rotating the connector 28 to unthread the mated helical threads. When the connector 28 is secured to the luminaire 10, the luminaire 10 may be mounted onto the stand 106 by inserting the mounting arm 108 of the stand 106 into the socket 34 of the connector 28 and then fastening the connector 28 to the mounting arm 108. FIG. 11 shows an end of the mounting arm 108 that is sized for insertion into the socket 34 of the connector 28, which is sized to receive the end of the mounting arm 108. An end section of the mounting arm 108 may have a smaller diameter than the rest of the mounting arm 108. The end section may also have an indentation 110 around a circumference of the end section to help secure the luminaire 10 onto the mounting arm 108. The connector 28 may comprise a fastener 32 designed to removably secure the connector 28 to the mounting arm 108. The fastener 32 may have an exterior knob that allows manual rotation of a threaded shank 33 that extends through an exterior wall of the connector 28 so that an end of the shank 33 extends into an interior of the socket 34. The shank 33 may have male screw threads that mate with female screw threads that extend through a threaded opening in the exterior wall of the connector 28. The fastener 32 may be rotated to force the end of the shank 33 of the fastener 32 against the indented section 110 of the end of the mounting arm 108 when the mounting arm 108 is inserted within the socket 34 to securely fasten the connector 28 to the mounting arm 108. The fastener 32 may also be rotated in an opposite direction to withdraw the shank 33 from the interior of the socket 34 to release the connector 28 from the mounting arm 108. Thus, the base and top mounting plates 20, 22 are preferably designed to provide for different mounting configurations for the luminaire 10 onto a mounting structure 106 by allowing the luminaire 10 to be mounted at either the base end 14 or the top end 16. Alternatively, other suitable types of fasteners may be utilized to removably secure the connector 28 to the mounting structure 106 or to either one of the base or top mounting plates 20, 22. For instance, other suitable types of fasteners that may be utilized for removably securing the connector 28 to a mounting structure 106 or to either of the base or top mounting plates 20, 22 may include, but are not limited to, spring-loaded pins, bayonet mounts, flange mounts, various types of clips, latches, or quick-connect fittings. It should be understood by one of skill in the art that such suitable types of fasteners that allow attachment and detachment of the connector 28 to and from the mounting structure 106 or to and from either mounting plate 20, 22 falls within the scope of the present disclosure. Similar types of fasteners, including spring-loaded pins, bayonet mounts, flange mounts, various types of clips, latches, or quick-connect fittings, may also be utilized to directly mount either mounting plate 20, 22 onto a mounting structure 106 without the use of a separate connector 28. It should be understood by one of skill in the art that such suitable types of fasteners that allow attachment and detachment of either mounting plate 20, 22 to and from the mounting structure 106 also falls within the scope of the present disclosure.

Figure 20:
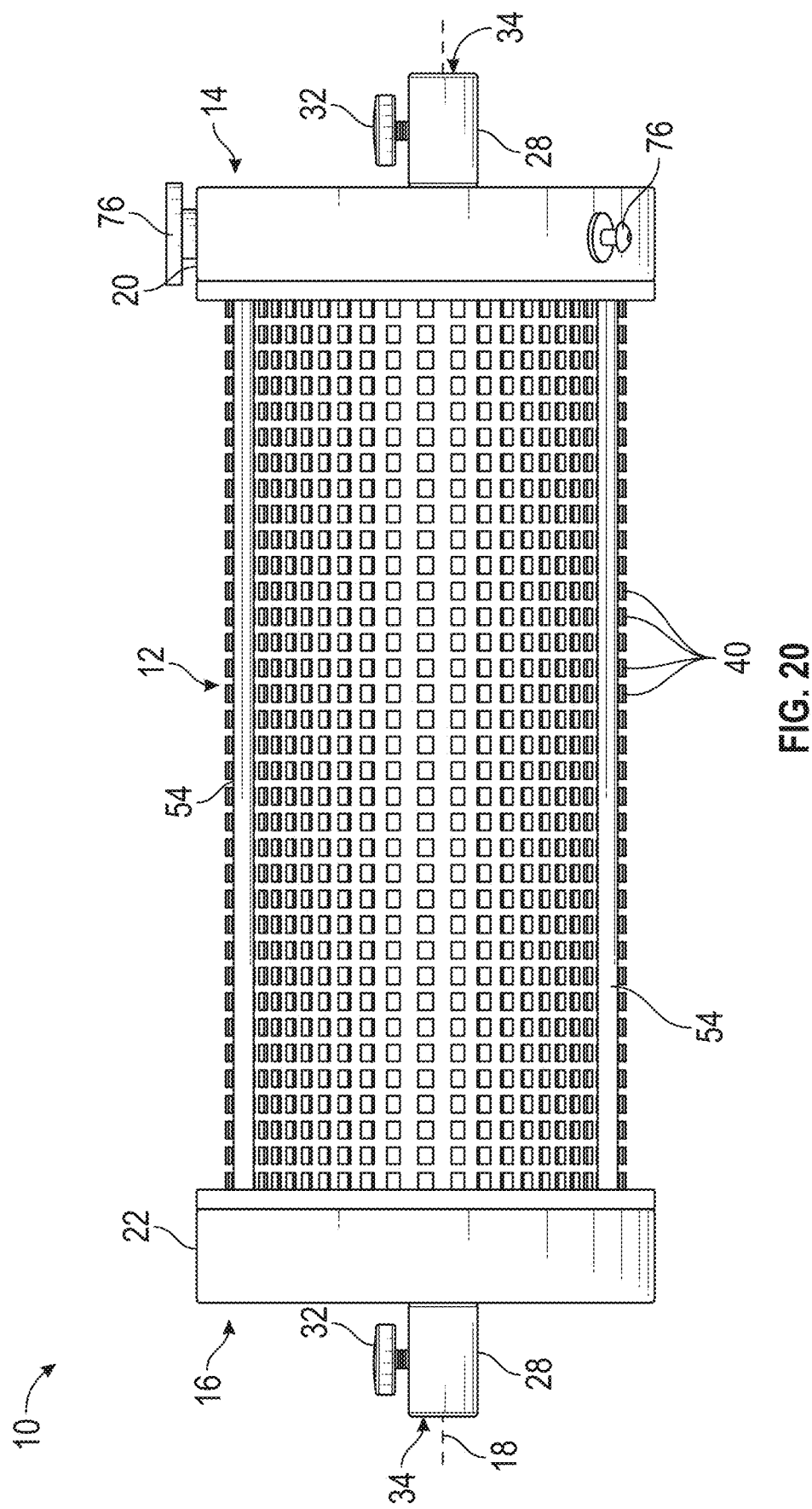
FIG. 20 shows a side view of a luminaire in accordance with the present disclosure.

Alternatively, as shown in FIG. 20, the luminaire 10 may include a connector 28 disposed at each end 14, 16 of the luminaire 10. In this case, the connectors 28 may be designed for removably securing each connector 28 to a respective one of the mounting plates 20, 22. Alternatively, the connectors 28 may be permanently attached to each of the base mounting plate 20 and the top mounting plate 22, respectively. The connectors 28 may be permanently attached in any suitable manner, such as by welding, brazing, or cementing. In this case, the base mounting plate 20 may have a first attachment point 34 and a first fastener 32, which may be designed to removably secure the base mounting plate 20 to a mounting structure 106 at the first attachment point 34, and the top mounting plate 22 may have a second attachment point 34 and a second fastener 32, which may be designed to removably secure the top mounting plate 22 to the mounting structure 106 at the second attachment point 34. The first and second attachment points may include any structure that is mechanically connected to or otherwise physically contacts the mounting structure 106 to fixedly secure one of the mounting plates 20, 22 to the mounting structure 106. As shown in FIG. 20, the first and second attachment points 34 may each be defined by a socket opening, which may be utilized to receive a component of the mounting structure 106 within the socket opening. Alternatively, the attachment points may be defined by other types of structures suitable for attachment of a mounting plate to a mounting structure utilizing a fastener.

The body 12 of the luminaire 10 is elongate and extends between the base mounting plate 20 and the top mounting plate 22. The luminaire 10 may have a generally cylindrical shape arranged around longitudinal axis 18. The body 12 may have a polyhedral shape, and mounting plates 20 and 22 may each have a circular outer shape to give the body 12 of the luminaire 10 a generally cylindrical shape overall. As best seen in FIG. 5, the body 12 of the luminaire 10 preferably comprises a plurality of thin heat sink plates 36 disposed in spaced relation to each other to aid in dispersing heat produced by the lights 40, 44. Alternatively, the body 12 may have other structural forms that provide structure for supporting lights 40 between two opposing ends 14 and 16. As such, the "body" of the luminaire 10 may refer to any structure disposed along axis 18 between two opposing ends 14 and 16. As best seen in FIG. 4, the body 12 may have an interior passageway 84 that extends through the body 12 in an axial direction along the longitudinal axis 18 between the base mounting plate 20 and the top mounting plate 22. The luminaire 10 may further comprise a fan 38 disposed within an interior of the body 12 and positioned to move air through the interior passageway 84 of the body 12 to help transfer heat away from the heat sink plates 36. As best seen in FIGS. 6-9, the base mounting plate 20 may have a plurality of vent openings 66, and the top mounting plate 22 may also have a plurality of vent openings 68 so that air moved by the fan 38 can move through both mounting plates 20, 22 to facilitate movement of air through the interior passageway 84. Alternatively, other devices and methods may be utilized for cooling the luminaire 10, including, but not limited to, a water cooling system comprising a pump that moves cool water through the fixture. Alternatively, other types of coolants may also be utilized.

The second plurality of lights may include a plurality of LED lights 44 operably mounted onto a printed circuit board 46 (PCB), which may have a generally circular shape. LED chips 44 may be soldered onto the PCB 46. The PCB 46 may be mounted onto an exterior side of the top mounting plate 22 using screws or bolts or by otherwise fastening or attaching the PCB 46 to the top mounting plate 22. FIG. 9 shows an exploded view of the top mounting plate 22 and the PCB 46 with LEDs 44 installed thereon. Screws for fastening PCB 46 to the top mounting plate 22 may be installed through openings 96 in PCB 46 and openings 98 in the top mounting plate 22. The top mounting plate 22 may also have one or more openings 94 that extend through the plate 22 for installation of electrical wiring to PCB 46 to power and control LEDs 44.

In a preferred embodiment, as best seen in FIGS. 3 and 4, the luminaire 10 may include a support structure 52, which may be attached to both the base mounting plate 20 and the top mounting plate 22, to provide structural support for components of the luminaire 10. The support structure 52 may comprise a plurality of rods 54 that each extends between the base mounting plate 20 and the top mounting plate 22. Each rod 54 may be attached to the base mounting plate 20 at one end 56 and to the top mounting plate 22 at an opposing end 58, as best seen in FIGS. 1 and 2. Individual rods 54 may be distributed around the exterior of the body 12 of the luminaire 10. Each rod 54 may be removably secured to each of the base mounting plate 20 and the top mounting plate 22. The ends 56, 58 of the rods 54 may each have threaded sections for fastening the rods 54 to the mounting plates 20, 22. Alternatively, other suitable types of support structures may be utilized to attach to the mounting plates 20, 22 to rigidly connect the mounting plates 20, 22 to each other in order to provide structural support to components of the luminaire 10. It should be understood by one of skill in the art that such support structures would still fall within the scope of the present disclosure. Further, it should be understood that the support structure may be integrally attached to or integrally formed with the body of the luminaire 10, or the support structure and body may be otherwise incorporated into a single structure that provides structural support for the luminaire 10 and support for mounting lights 40 between mounting plates 20 and 22.

In a preferred embodiment, as shown in FIGS. 3 and 4, the luminaire 10 may include a support ring 50 positioned adjacent to the main printed circuit board 48, which may be a ring-shaped circular PCB sized to fit against the support ring 50. The support ring 50 provides support for PCB 48 and separates PCB 48 from the heat sink plates 36 of the body 12 of the luminaire 10. The main PCB 48 is configured to distribute incoming power to LEDs 40 and 44. To assemble the luminaire 10, a threaded end 58 of each rod 54 may be threaded into one respective threaded opening 62 in the top mounting plate 22 to fasten each rod 54 to the top mounting plate 22. The body 12, including the PCBs 42 with LEDs 40, may be positioned against an interior side of the top mounting plate 22 with the rods 54 disposed around the exterior of the body 12. An opposing threaded end 56 of each rod 54 may then be inserted through respective openings 86 in the support ring 50, openings 88 in the main PCB 48, and openings 60 in the base mounting plate 20. As best seen in FIG. 6, which shows an end view of the base end 14 of the luminaire 10, a threaded nut 64 may then be threaded onto each respective threaded end 58 of each rod 54 to fasten the base mounting plate 20 and the top mounting plate 22 to each other to form a rigidly connected structure with the body 12, the support ring 50, and the main PCB 48 all pressed firmly together between the two mounting plates 20, 22 due to pressure applied by tightening the nuts 64.

Wiring may electrically connect optional switches 72 and 74 to PCB 48 and PCB 46, respectively, for providing separate kill switches for LEDs 40 and 44, respectively. Wiring from switches 72 and 74 may be connected to connector 150 on PCB 48. When assembling the luminaire 10, wiring to PCB 46 may be installed through openings 92 in the body 12 and one or more openings 94 in the top mounting plate 22. A plurality of openings 92 may extend through each of the heat sink plates 36 in alignment through the length of the body 12 for connecting to PCB 46. Wiring may also be installed that connects main PCB 48 to a motor for the fan 38 to power on the fan 38 when the luminaire 10 is powered on.

As best seen in FIGS. 14 and 17, the luminaire 10 may optionally be utilized as part of a system 100 to provide lighting effects, which may be used in photographic, theatrical, and cinematic settings. The system 100 comprises the luminaire 10, a stand 106 or other mounting structure, and a lighting modifier 102. The lighting modifier 102 comprises a concave inner surface 104 that defines an interior of the lighting modifier 102. The lighting modifier 102 is mountable onto the stand 106 in a position in which the luminaire 10 is disposed within the interior of the lighting modifier 102. The inner surface 104 is reflective so that light emitted by the luminaire 10 is reflected off the inner surface 104 toward a subject, which provides indirect, soft light on the subject. The lighting modifier 102 may be a square softbox, such as the softbox shown in FIGS. 12 and 14, or a parabolic reflector, such as the reflector shown in FIGS. 15-17. Other types of lighting modifiers 102 may also be utilized, including, but not limited to, a spherical or parabolic lamp reflector, a beauty dish, or any type of concave reflector. The luminaire 10 may be mounted onto the stand 106 at the base mounting plate 20 or the top mounting plate 22, depending on a mounting configuration to achieve a desired lighting effect. FIGS. 12 and 14 show the base mounting plate 20 mounted onto the stand 106, and FIGS. 15-17 show the top mounting plate 22 mounted onto the stand 106.

Figure 13:
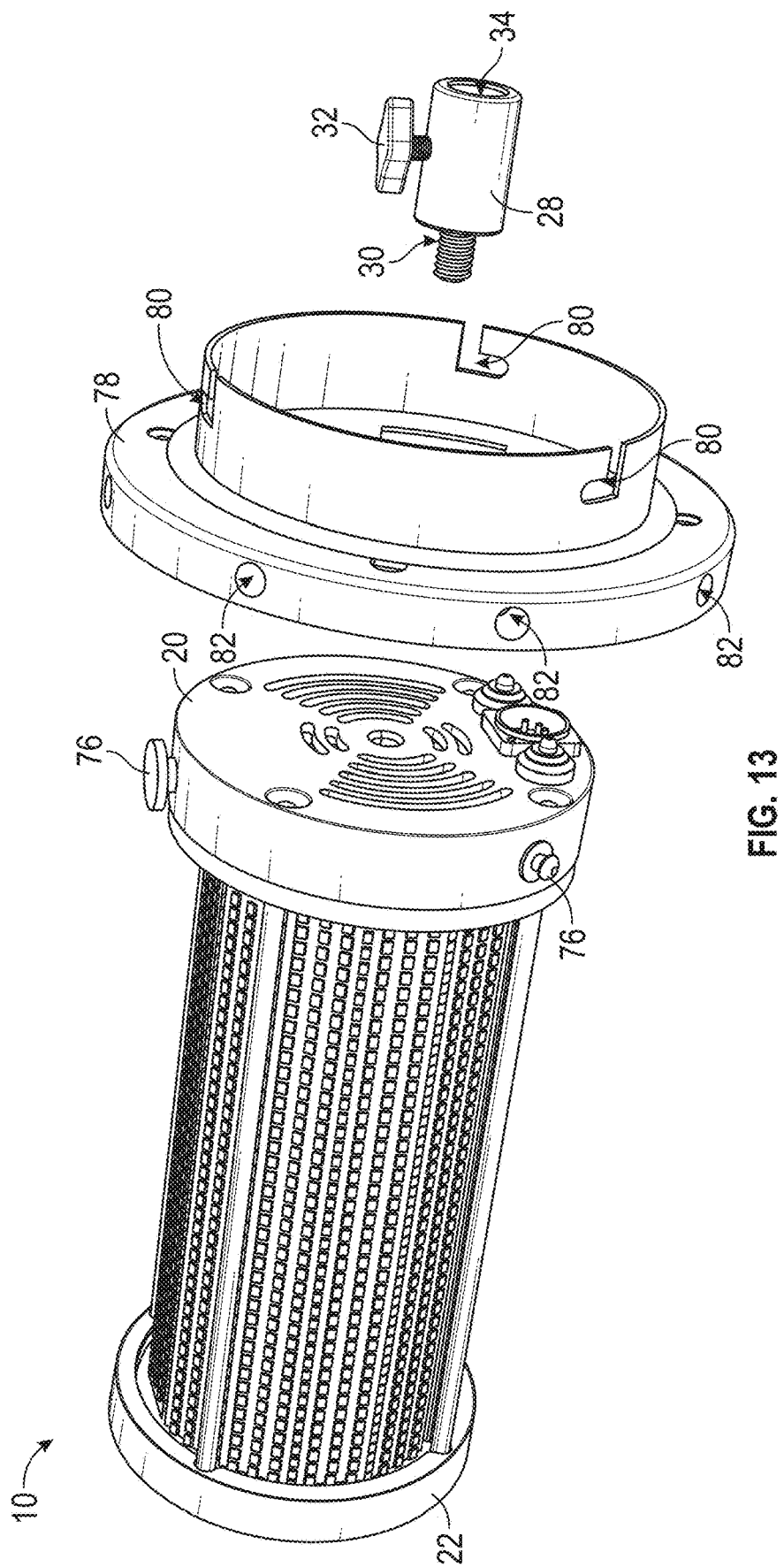
FIG. 13 shows an exploded view of a luminaire with an adapter for attaching a lighting modifier to the luminaire in accordance with the present disclosure.

As best seen in FIG. 13, the system 100 may optionally further comprise an adapter 78 designed to removably attach the lighting modifier 102 to the base mounting plate 20 at the base end 14 of the luminaire 10. Components of the base mounting plate 20 and the adapter 78 may form a bayonet mount. The adapter 78 may have a ringed shape and may be sized to fit around the exterior of the base mounting plate 20, as best seen in FIG. 12. To secure the adapter 78 to the base mounting plate 20, the adaptor 78 may have a plurality of L-shaped mounting slots 80 designed to be compatible with a plurality of radial mounting pins 76 that are attached to the base mounting plate 20 and extend radially outward from the base mounting plate 20. A user may slide the adapter 78 around the top mounting plate 22 and over the body 12 of the luminaire 10. The mounting slots 80 may be aligned with the mounting pins 76 so that each mounting pin 76 is simultaneously inserted into one respective mounting slot 80. The adapter 78 may then be rotated so that the mounting pins 76 rotate within each of the L-shaped mounting slots 80 to secure the adapter 78 to the base mounting plate 20. The adapter 78 may have a plurality of mounting holes 82 for securing the lighting modifier 102 to the adapter 78, as shown in FIG. 12.

When the luminaire 10 is mounted on the base mounting plate 20, the top mounting plate 22 is facing outwardly away from the inner surface 104 of the lighting modifier 102. In this case, the lights 40 of any of the lighting zones 42 distributed around the body 12 of the luminaire 10 may be activated to provide indirect light from the modifier 102 onto the subject, while the outwardly facing lights 44 on the top mounting plate 22 may be deactivated to minimize direct light on the subject. As shown in FIGS. 12 and 14, the mounting arm 108 of the stand 106 may be relatively short, and the stand 106 may include a joint 112 that allows vertical pivoting of the lighting modifier 102 and luminaire 10 to position the modifier 102 in a desired lighting position. The joint 112 may also allow rotation within a vertical portion of the stand 106. The stand 106 may also be designed to allow height adjustment of the modifier 102. Once the lighting modifier 102 and luminaire 10 are mounted onto the stand 106, the power supply cable 116 may be plugged into the electrical outlet 70 of the luminaire 10, as shown in FIG. 14, to provide power to the luminaire 10. The power supply box 114 may then be plugged into mains AC power using the main AC power cord 118. Alternatively, an external battery may be used as a power source and may be electrically connected to the power supply box 114.

Figure 16:
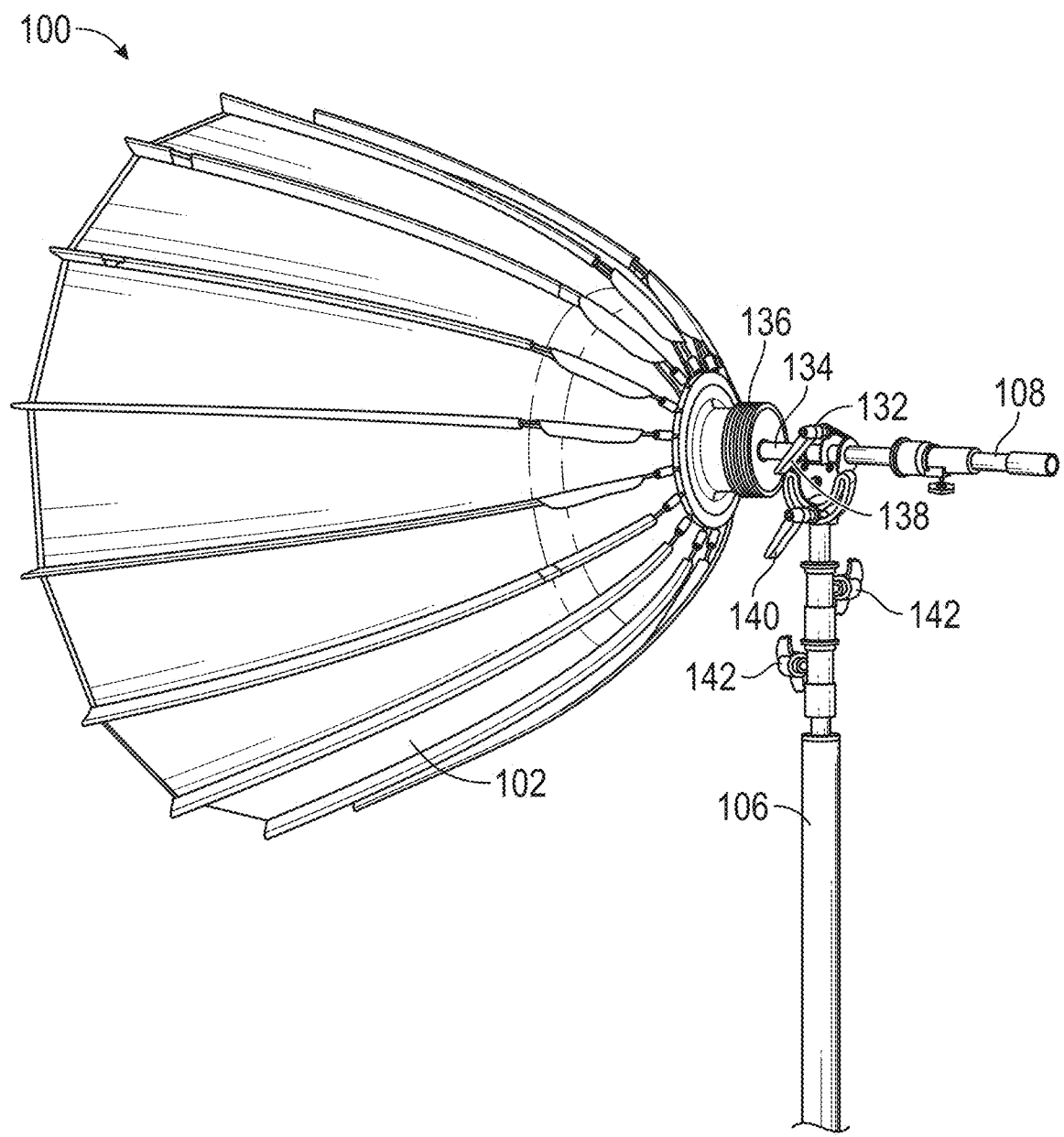
FIG. 16 shows a rear perspective view of a lighting modifier mounted onto a stand in accordance with the present disclosure.

FIGS. 15-17 show the top mounting plate 22 mounted onto the stand 106. In this case, the stand 106 may include a joint 132 in which the mounting arm 108 is slidably mounted within a sheath 134 so that the position of the luminaire 10 within the interior of the lighting modifier 102 may be adjusted by sliding the mounting arm 108 within the sheath 134, which may be used to adjust the quality of the light produced by the system 100. Handle 138 may be utilized to lock and to release the mounting arm 108 within the sheath 134. The lighting modifier 102 may also be mounted onto the exterior of the sheath 134 in which the mounting arm 108 is disposed. As best seen in FIG. 16, the lighting modifier 102 may be mounted onto the sheath 134 by a collar 136 having a central opening that fits tightly around the exterior of the sheath 134 to securely hold the lighting modifier 102 in place. The joint 132 may also allow vertical pivoting of the lighting modifier 102 and luminaire 10 to position the modifier 102 in a desired lighting position. Handle 140 may be utilized to lock and to release the joint 132 in place to allow adjustment of the vertical pivot position. The stand 106 may also include one or more knobs 142 that allow vertical adjustment of the lighting modifier 102 and luminaire 10 by locking and releasing one or more telescoping vertical extensions. Once the lighting modifier 102 and luminaire 10 are mounted onto the stand 106 in a desired position, the power supply cable 116 may be plugged into the electrical outlet 70 of the luminaire 10, as shown in FIG. 17, to provide power to the luminaire 10. In this mounting configuration, the luminaire 10 is mounted on the top mounting plate 22 with the top mounting plate 22 facing inwardly toward the inner surface 104 of the lighting modifier 102 and the base mounting plate 20 facing outwardly away from the inner surface 104 of the lighting modifier 102. In this configuration, the lights 44 on the top mounting plate 22 may optionally be activated to emit additional light directly toward the innermost portion of the inner surface 104 of the lighting modifier 102 in order to provide additional indirect light reflected off of the reflective inner surface 104 of the modifier 102. The quality of this light may be altered by adjusting the distance between the lights 44 on the top mounting plate 22 and the inner surface 104 of the lighting modifier 102, which may be done by sliding the mounting arm 108 within the sheath 134 to a desired position. In either mounting configuration, lights 40 and 44 may be independently controlled.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A luminaire comprising:
    an elongate body having a first end and an opposing second end;
    a light source configured to emit light radially from the body relative to a longitudinal axis extending from the first end to the second end,
    wherein the light source comprises a plurality of light zones, wherein each of the plurality of light zones defines an area of the body from which light is emitted, wherein the plurality of light zones in combination is configured to emit light radially from the body in a 360-degree arc relative to the longitudinal axis, wherein each of the plurality of light zones is independently controllable;

a main circuit board comprising a process controller and a plurality of digital switches;

a power supply unit, wherein the power supply unit is external to the body of the luminaire; and a power supply cable connecting the luminaire to the power supply unit, wherein the power supply cable comprises power lines and one or more data lines operably connected to the main circuit board, and wherein the process controller is configured to regulate power independently to each of the light zones using the plurality of digital switches based on data signals transmitted from the power supply unit via the data lines.

2. The luminaire of claim 1, wherein each of the plurality of light zones extends longitudinally along a length of the body from the first end to the second end.

3. The luminaire of claim 1, wherein the main circuit board is mounted on the body of the luminaire.

4. The luminaire of claim 1, wherein the process controller comprises a microcontroller.

5. The luminaire of claim 1, wherein each of the plurality of digital switches comprises a transistor.

6. The luminaire of claim 1, wherein each of the plurality of light zones comprises a plurality of LED lights.

7. The luminaire of claim 1, wherein each of the plurality of light zones is defined by a plurality of LED lights operably mounted onto an LED circuit board, wherein each LED circuit board is mounted onto the body of the luminaire.

8. The luminaire of claim 7, wherein each LED circuit board extends longitudinally along an exterior of the body from the first end to the second end.

9. The luminaire of claim 1, wherein the body of the luminaire has an electrical outlet designed to removably attach the power supply cable to the electrical outlet to connect the luminaire to the power supply unit to supply power to the light source.

10. The luminaire of claim 1, further comprising a base mounting plate disposed at the first end and a top mounting plate disposed at the second end, wherein each of the base mounting plate and the top mounting plate is designed to be individually mounted onto a mounting structure to support the luminaire.

11. The luminaire of claim 10, further comprising a second light source configured to emit light in an axial direction from an exterior side of the top mounting plate, wherein the second light source is controllable independently from each of the plurality of light zones.

12. A luminaire comprising:

an elongate body having a first end and an opposing second end;

a light source configured to emit light radially from the body relative to a longitudinal axis extending from the first end to the second end, wherein the light source comprises a plurality of light zones, wherein each of the plurality of light zones defines an area of the body from which light is emitted, wherein the plurality of light zones in combination is configured to emit light radially from the body in a 360-degree arc relative to the longitudinal axis, wherein each of the plurality of light zones is independently controllable;

a main circuit board mounted onto the luminaire, wherein the main circuit board comprises a process controller and a plurality of digital switches;

a power supply unit, wherein the power supply unit is external to the body of the luminaire;

a wireless data transmitter; and a wireless receiver operably connected to the main circuit board, wherein the receiver is configured to receive data signals from the transmitter, and wherein the process controller is configured to regulate power independently to each of the light zones based on the data signals transmitted from the transmitter.

13. The luminaire of claim 12, wherein each of the plurality of light zones extends longitudinally along a length of the body from the first end to the second end.

14. The luminaire of claim 12, wherein the process controller comprises a microcontroller.

15. The luminaire of claim 12, wherein each of the plurality of digital switches comprises a transistor.

16. The luminaire of claim 12, wherein each of the plurality of light zones is defined by a plurality of LED lights operably mounted onto an LED circuit board, wherein each LED circuit board is mounted onto the body of the luminaire.

17. The luminaire of claim 16, wherein each LED circuit board extends longitudinally along an exterior of the body from the first end to the second end.

18. The luminaire of claim 12, further comprising a power supply cable connecting the luminaire to the power supply unit, wherein the body of the luminaire has an electrical outlet designed to removably attach the power supply cable to the electrical outlet to connect the luminaire to the power supply unit to supply power to the light source.

19. The luminaire of claim 12, further comprising a base mounting plate disposed at the first end and a top mounting plate disposed at the second end, wherein each of the base mounting plate and the top mounting plate is designed to be individually mounted onto a mounting structure to support the luminaire.

20. The luminaire of claim 19, further comprising a second light source configured to emit light in an axial direction from an exterior side of the top mounting plate, wherein the second light source is controllable independently from each of the plurality of light zones.

* * * * *